United States Patent
Chao et al.

(10) Patent No.: US 10,609,417 B2
(45) Date of Patent: Mar. 31, 2020

(54) HIGH EFFICIENCY ADAPTIVE LOOP FILTER PROCESSING FOR VIDEO CODING

(71) Applicant: MEDIATEK INC., Hsinchu (TW)

(72) Inventors: Ping Chao, Taipei (TW); Chih-Ming Wang, Zhubei (TW); Yung-Chang Chang, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 66 days.

(21) Appl. No.: 15/596,752

(22) Filed: May 16, 2017

(65) Prior Publication Data

US 2017/0339432 A1 Nov. 23, 2017

Related U.S. Application Data

(60) Provisional application No. 62/340,015, filed on May 23, 2016.

(51) Int. Cl.
*H04N 19/82* (2014.01)
*H04N 19/42* (2014.01)
*H04N 19/423* (2014.01)

(52) U.S. Cl.
CPC ........... *H04N 19/82* (2014.11); *H04N 19/423* (2014.11); *H04N 19/439* (2014.11)

(58) Field of Classification Search
CPC ..... H04N 19/82; H04N 19/423; H04N 19/439
USPC .................................................. 375/240.29
See application file for complete search history.

(56) References Cited

U.S. PATENT DOCUMENTS

| | | | | |
|---|---|---|---|---|
| 2012/0189064 A1* | 7/2012 | Kossentini | ........... | H04N 19/147 375/240.25 |
| 2013/0272624 A1* | 10/2013 | Budagavi | .................. | G06T 9/00 382/239 |
| 2014/0269913 A1* | 9/2014 | Lee | ....................... | H04N 19/197 375/240.12 |
| 2014/0328413 A1* | 11/2014 | Esenlik | ................ | H04N 19/197 375/240.29 |
| 2015/0312569 A1* | 10/2015 | Araki | ..................... | H04N 19/82 375/240.29 |

* cited by examiner

*Primary Examiner* — Ayman A Abaza
(74) *Attorney, Agent, or Firm* — Oblon, McClelland, Maier & Neustadt, L.L.P.

(57) ABSTRACT

A method and a circuit for adaptive loop filtering in a video coding system are described. The method can include receiving a block of samples generated from a previous-stage filter circuit in a filter pipeline, the block of samples being one of multiple blocks included in a current picture, performing, in parallel, adaptive loop filter (ALF) processing for multiple target samples in the block of samples, while the previous-stage filter circuit is simultaneously processing another block in the current picture, storing, in a buffer, first samples each having a filter input area defined by a filter shape that includes at least one sample which has not been received, and storing, in the buffer, second samples included in the filter input areas of the first samples.

20 Claims, 15 Drawing Sheets

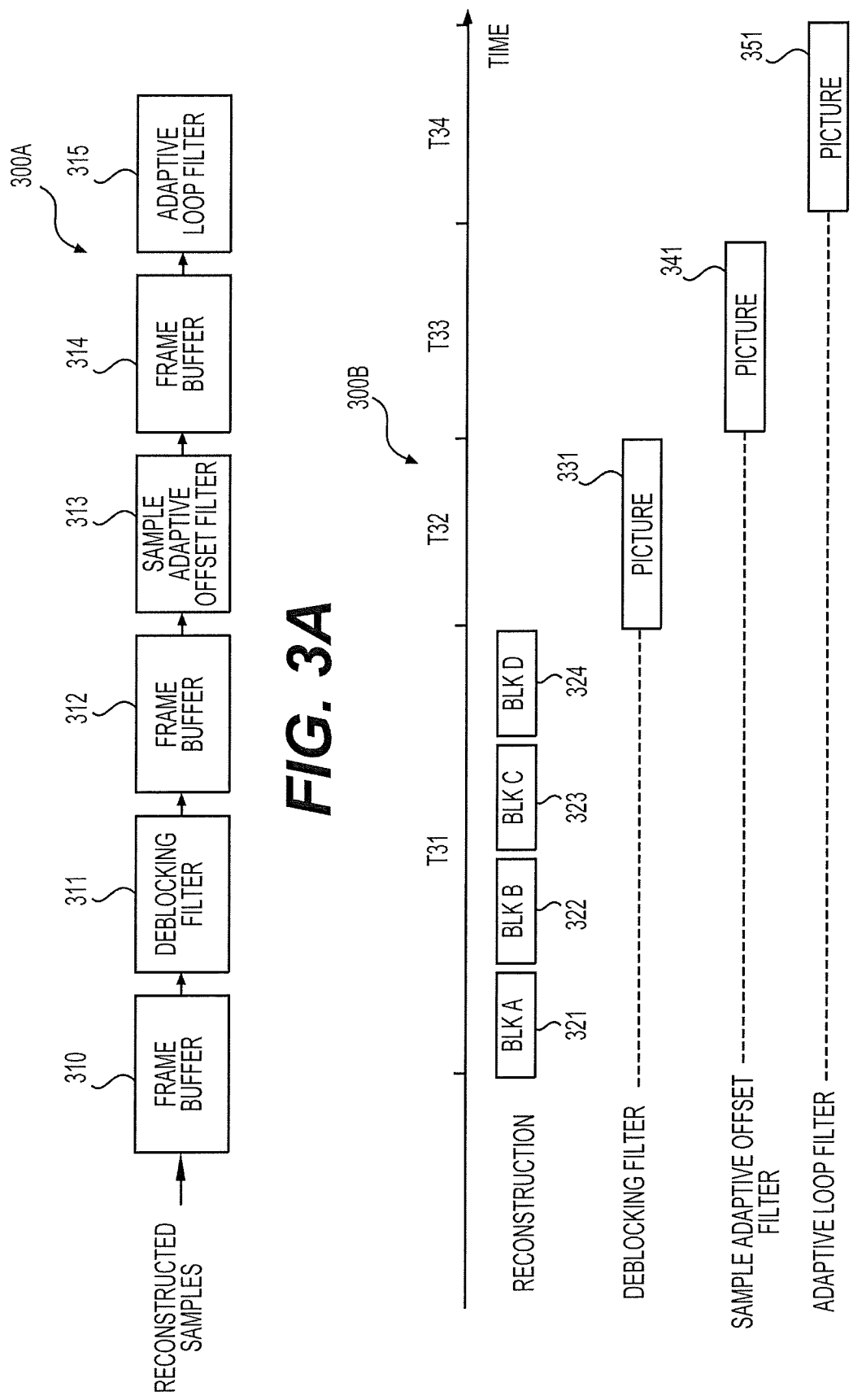

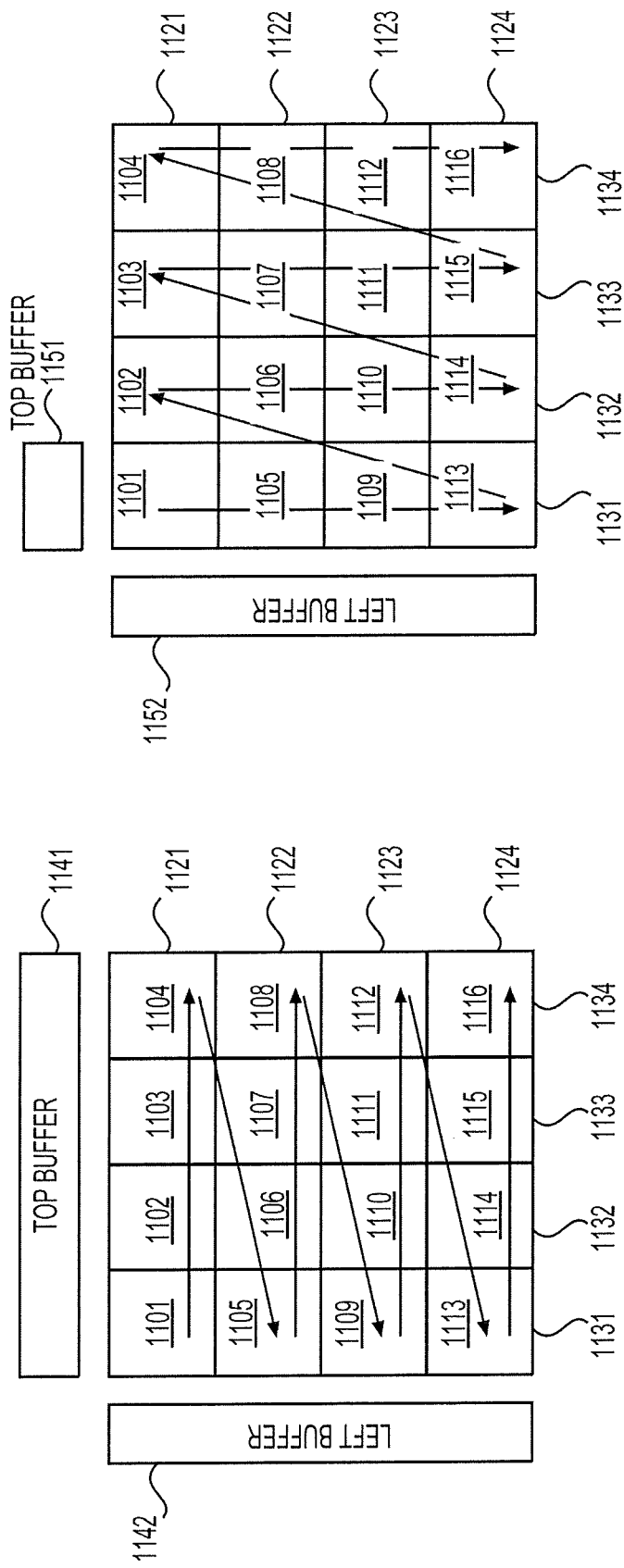

HIGH EFFICIENCY ADAPTIVE LOOP FILTER PROCESSING FOR VIDEO CODING

INCORPORATION BY REFERENCE

This present disclosure claims the benefit of U.S. Provisional Application No. 62/340,015, "High Efficiency ALF Processing for Video Coding" filed on May 23, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Block-based motion compensation, transform and quantization are broadly employed for video compression to improve performance of video communication systems. However, due to coarse quantization and motion compensation, compression noise can be introduced which causes artifacts, such as blocking, ringing, and blurring, in reconstructed pictures. In-loop filters can be employed to reduce the compression noise, which can not only improve quality of output decoded pictures, but also provide high quality reference pictures for succeeding pictures to save coding bits. Adaptive loop filter is one type of such in-loop filters. An adaptive loop filtering process can minimize the mean square error between original samples and reconstructed samples by using a Wiener-based adaptive filter.

SUMMARY

Aspects of the disclosure provide a method for adaptive loop filtering in a video coding system. The method can include receiving a block of samples generated from a previous-stage filter circuit in a filter pipeline, the block of samples being one of multiple blocks included in a current picture, performing, in parallel, adaptive loop filter (ALF) processing for multiple target samples in the block of samples, while the previous-stage filter circuit is simultaneously processing another block in the current picture, storing, in a buffer, first samples each having a filter input area defined by a filter shape that includes at least one sample which has not been received, and storing, in the buffer, second samples included in the filter input areas of the first samples.

In an example, the previous-stage filter circuit is a deblocking filter (DF) circuit or a sample adaptive offset filter (SAO) circuit. In an embodiment, the method further includes receiving a next block of samples adjacent to the block of samples, reading, from the buffer, the first and second samples, and performing ALF processing for at least a portion of samples in a block formed by the next adjacent block of samples and the first samples stored in the buffer. In an embodiment, the method further includes starting to perform ALF processing for at least one target sample in the received block of samples before the previous-stage filter circuit completes processing for samples in a current coding tree unit including the received block of samples.

In an embodiment of the method, the buffer includes a left buffer including a first portion of the first and second samples adjacent to a first to-be-processed block in the same row as the block of samples, and a top buffer including a second portion of the first and second sample adjacent to a second to-be-processed block in the same column as the block of samples. In an embodiment, the first and second samples are P+Q columns of samples adjacent to a next block in the picture, P and Q being a left span and a right span of the filter shape.

In an embodiment, performing, in parallel, ALF processing for multiple target samples in the block of samples includes receiving samples in the block of sample, performing first ALF processing for a first target sample in the block of samples to generate a first filtered sample based on received samples in a first filter input area of the first target sample defined by the filter shape, and performing second ALF processing for a second target pixel in the block of samples neighboring the first target pixel to generate a second filtered sample based on received samples in a second filter input area of the second target sample defined by the filter shape, wherein received samples used for the first ALF processing for the first target sample are reused for the second ALF processing for the second target sample.

In one example, receiving the samples in the block includes receiving the samples in the block line by line as input to a multiple stage pipeline filter (MSPF) circuit, and the first and second filtered samples are generated from the MSPF circuit successively. In another example, receiving the samples in the block includes receiving the samples in the block line by line as an input to a first MSPF circuit and a second MSPF circuit operating in parallel with the first MSPF circuit, and the first and second filtered samples are generated at the first and second MSPF circuits, respectively, based on the received samples in the block.

In an embodiment, receiving the samples in the block includes shifting in samples in the block line by line into an array of shift registers having rows of shift registers, each row of shift registers storing a line of shifted-in samples. Accordingly, performing the first and second ALF processing includes calculating the first filtered sample based on samples currently stored in the array of shift registers by a multiply-add circuit that is coupled to the array of shift registers to receive samples from the array of shift registers, shifting in a next line of samples in the first block into the array of shift registers, and calculating the second filtered sample based on the samples currently stored in the array of shift registers at the multiply-add circuit.

In another embodiment, receiving the samples in the block includes shifting in samples in the block line by line into an array of shift registers having rows of shift registers, each row of shift registers storing a line of samples. Accordingly, performing the first and second ALF processing includes calculating the first filtered sample based on a first set of samples currently stored in the array of shift registers by a first multiply-add circuit that is coupled to the array of shift registers to receive the first set of samples from the array of shift registers, and calculating, in parallel with calculation of the first filtered sample, the second filtered sample based on a second set of samples currently stored in the array of shift registers by a second multiply-add circuit that is coupled to the array of shift registers to receive the second set of samples from the array of shift registers, the second set of samples including part of the first set of samples.

An embodiment of the method further includes partitioning the block of samples into a first sub-block and a second-sub block. Then, first ALF processing for a first target sample in the first sub-block of samples is performed in parallel with performing second ALF processing for a second target sample in the second sub-block of samples.

Aspects of the disclosure provide an adaptive loop filter (ALF) circuit in a video coding system. The ALF circuit can include a work buffer configured to store a block of samples generated from a previous-stage filter circuit in a filter pipeline, the block of samples being one of multiple blocks included in a current picture, a filter circuit configured to perform, in parallel, adaptive loop filter (ALF) processing for multiple target samples in the block of samples, while the previous-stage filter circuit is simultaneously processing another block in the current picture, and a side buffer configured to store first samples each having a filter input area defined by a filter shape that includes at least one sample which has not been received, and to store second samples included in the filter input areas of the first samples.

BRIEF DESCRIPTION OF THE DRAWINGS

Various embodiments of this disclosure that are proposed as examples will be described in detail with reference to the following figures, wherein like numerals reference like elements, and wherein:

FIG. 3A shows a conventional picture level filter pipeline;

FIG. 3B shows an example timing diagram of a picture level filter pipeline operating on a picture-by-picture basis;

FIGS. 11A-11B show a third block level processing technique according to an embodiment of the disclosure;

DETAILED DESCRIPTION OF EMBODIMENTS

Figure 1:
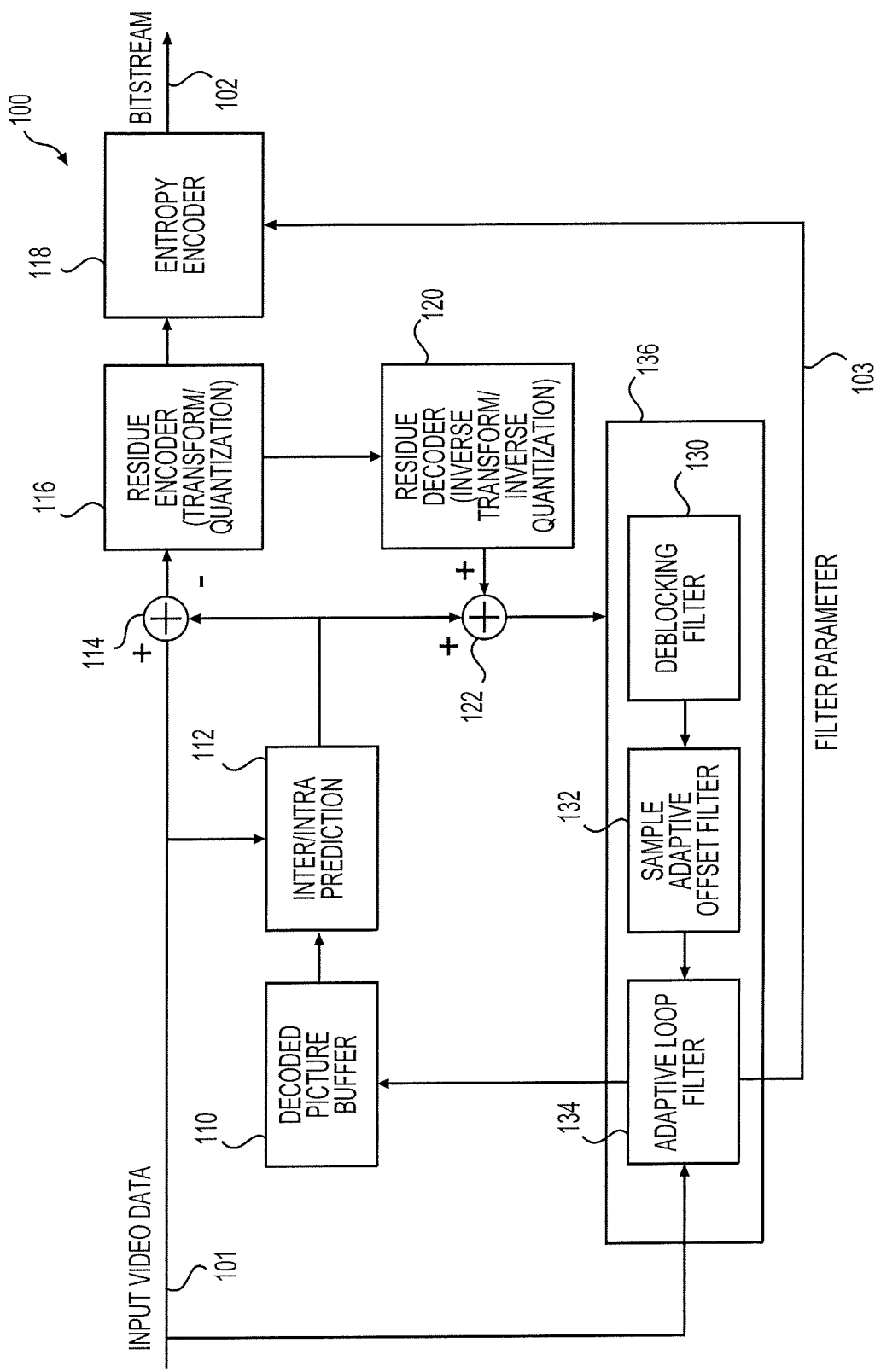
FIG. 1 shows an encoder according to an embodiment of the disclosure.

FIG. 1 shows an encoder 100 according to an embodiment of the disclosure. The encoder 100 can include a decoded picture buffer 110, an inter-intra prediction module 112, a first adder 114, a residue encoder 116, an entropy encoder 118, a residue decoder 120, a second adder 122, a deblocking filter (DF) 130, a sample adaptive offset filter (SAO) 132, and an adaptive loop filter (ALF) 134. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bit stream 102 can have a format compliant with a video coding standard, such as the Advanced Video Coding (AVC) standards, High Efficiency Video Coding (HEVC) standards, and the like.

According to an aspect of the disclosure, the ALF 134 can employ block level processing techniques to process reconstructed video data on a block-by-block basis. Conventional ALF is a picture level coding tool requiring a buffer for a whole picture. In contrast, a block level ALF can have a smaller work buffer storing a block of samples. The block based ALF 134 enables a block level filter pipeline 136, for example, formed by the DF 130, the SAO 132, and the ALF 134, which can reduce processing delay and buffer size compared with a conventional picture level filter pipeline. In addition, the ALF 134 can employ data reuse techniques to reduce data access time of ALF processing performed on reconstructed samples. For example, sample data acquired in one data access operation can be used for ALF processing on multiple pixels. Further, in one example, two filter pipelines can be employed and operate in parallel. Each of the two filter pipelines can include an ALF similar to the ALF 134.

In FIG. 1, the decoded picture buffer 110 stores reference pictures for motion estimation and motion compensation performed at the inter-intra prediction module 112. The inter-intra prediction module 112 performs inter picture prediction or intra picture prediction to determine a prediction for a block of a current picture during the video compression process. A current picture refers to a picture in the input video data 101 that is being processed in the inter-intra prediction module 112. The current picture can be divided into multiple blocks with a same or different size for the inter or intra prediction operations.

In one example, the inter-intra prediction module 112 processes a block using either inter picture coding techniques or intra picture coding techniques. Accordingly, a block encoded using inter picture coding is referred to as an inter coded block, while a block encoded using intra picture coding is referred to as an intra coded block. The inter picture coding techniques use the reference pictures to obtain a prediction of a currently being processed block (referred to as a current block). For example, when encoding a current block with inter picture coding techniques, motion estimation can be performed to search for a matched region in the reference pictures. The matched region is used as a prediction of the current block. In contrast, the intra picture coding techniques employ neighboring blocks of a current block to generate a prediction of the current block. The neighboring blocks and the current block are within a same picture. The predictions of blocks are provided to the first and second adders 114 and 122.

The first adder 114 receives a prediction of a block from the inter-intra prediction module 112 and original samples of the block from the input video data 101. The adder 114 then subtracts the prediction from the original sample values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), wavelet transform, and the like, to received residues corresponding to a transform block and generate transform coefficients of the transform block. Partition of a picture into transform blocks can be the same as or different from partition of the picture into prediction blocks for inter-intra prediction processing. Subsequently, the residue encoder 116 can quantize the coefficients to compress the residues. The compressed residues (quantized transform coefficients) are transmitted to the residue decoder 120 and the entropy encoder 118.

The residue decoder 120 receives the compressed residues and performs an inverse process of the quantization and transformation operations performed at the residue encoder 116 to reconstruct residues of a transform block. Due to the quantization operation, the reconstructed residues are similar to the original resides generated from the adder 114 but typically are not the same as the original version.

The second adder 122 receives predictions of blocks from the inter-intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then be transferred to the filter pipeline 136.

In one example, the filter pipeline 136 includes the DF 130, the SAO 132, and the ALF 134, and performs block based filtering processes. For example, a picture can be partitioned into multiple blocks. Accordingly, reconstructed video data can be generated from the second adder 122 block by block. The filter pipeline 136 receives reconstructed video data and processes the reconstructed data block by block. In one example, partition of pictures into blocks is consistent with partition of pictures into coding tree units (CTU) as defined in the HEVC standards. As defined, a picture can be divided into a sequence of CTU. Each CTU can be further divided into smaller coding units (CU). CUs in a CTU can be processed by the encoder independently through steps of motion estimation and compensation, transform, quantization and reconstruction. Each CTU or CU can include blocks of samples corresponding to different color components.

The DF 130 applies a set of low-pass filters to block boundaries to reduce blocking artifacts. The filters can be applied based on characteristics of reconstructed samples on both sides of block boundaries in a reconstructed picture as well as prediction parameters (coding modes or motion vectors) determined at the inter-intra prediction module 112. The deblocked reconstructed samples can then be provided to the SAO 132. The SAO 132 receives the deblocked reconstructed samples and categorizes pixels in the reconstructed video data into groups. The SAO 132 can then determine an intensity shift (offset value) for each group to compensate intensity shifts of each group. The shifted reconstructed video data can then be provided from the SAO 132 to the ALF 134. As an example, a DF and a SAO is defined in the HEVC standards.

In one example, the ALF 134 receives a block of reconstructed samples from the SAO 132 and performs an adaptive loop filtering process. During the adaptive loop filtering process, ALF processing is performed for each target pixel (or target sample) in the block by applying a finite impulse response (FIR) filter. In one example, the FIR filter can be represented by the following expression, $$S_t = \sum_{i=1}^{N} C_i \cdot S_i, \qquad (1)$$

where St represents a filtered sample of a target pixel (or target sample), i is an index indicating to-be-filtered pixels in a to-be-filtered area (also referred to as a filter input area) surrounding the target pixel, N represents a number of the to-be-filtered samples included in the to-be-filtered area of the target pixel, Ci represents a filter coefficient corresponding to the i-th to-be-filtered pixel, and Si represents a to-be-filtered sample corresponding to the i-th pixel and is referred to as a tap of the FIR filter. As shown, a FIR filter can be defined by a sequence of filter coefficients, and a filtered sample of a target pixel can be calculated by applying the FIR filter to samples neighboring the target pixel. Applying an FIR filter to samples neighboring a target pixel to obtain a filtered sample is referred to as ALF processing for the target pixel.

In one example of the adaptive loop filtering process, filter coefficients of an FIR filter is first derived upon receiving the block of reconstructed samples. For example, filtered samples of target pixels in the block can be represented by using the expression (1). Accordingly, a sum of square errors (SSE) between original samples received from the input video data and the filtered samples can be formulated. By minimizing the SSE, Wiener-Hopf equations can be derived. Filter coefficients can subsequently be derived by solving the Weiner-Hopf equations. After deviation of the filter coefficients, the FIR filter can be determined and applied to the target pixels to acquire a filtered block. At the final stage of the adaptive loop filtering process, the filtered block can be stored to the decoded picture buffer 110 to form a reference picture, and filter parameters 103 including the derived coefficients can be provided to the entropy encoder 118 and subsequently transmitted to a decoder.

In alternative examples of the adaptive loop filtering process, the FIR filter to be applied to the target pixels can be selected from a set of preconfigured FIR filters, for example, based on characteristics of the block of reconstructed samples. In addition, an on/off control flag indicating whether to apply an FIR filter to a block may be determined for a block, for example, based on a performance criteria for evaluating effect of the adaptive loop filtering process. The on/off control flags and indexes indicating a preconfigured FIR filter can also be included in the filter parameters 103 and signaled to the decoder.

The entropy encoder 118 receives the compressed residues from the residue encoder 116 and filter parameters 103 from the ALF 134. The entropy encoder 118 may also receive other parameters and/or control information, such as intra prediction mode information, motion vectors, quantization parameters, parameters or control tags from the DF 130 and the SAO 132, and the like. The entropy encoder 118 encodes the received filter parameters or other information to form the bitstream 102. The bitstream 102 can be transmitted to a decoder via a communication network, or transmitted to a storage device where video data carried by the bitstream 102 can be stored.

Figure 2:
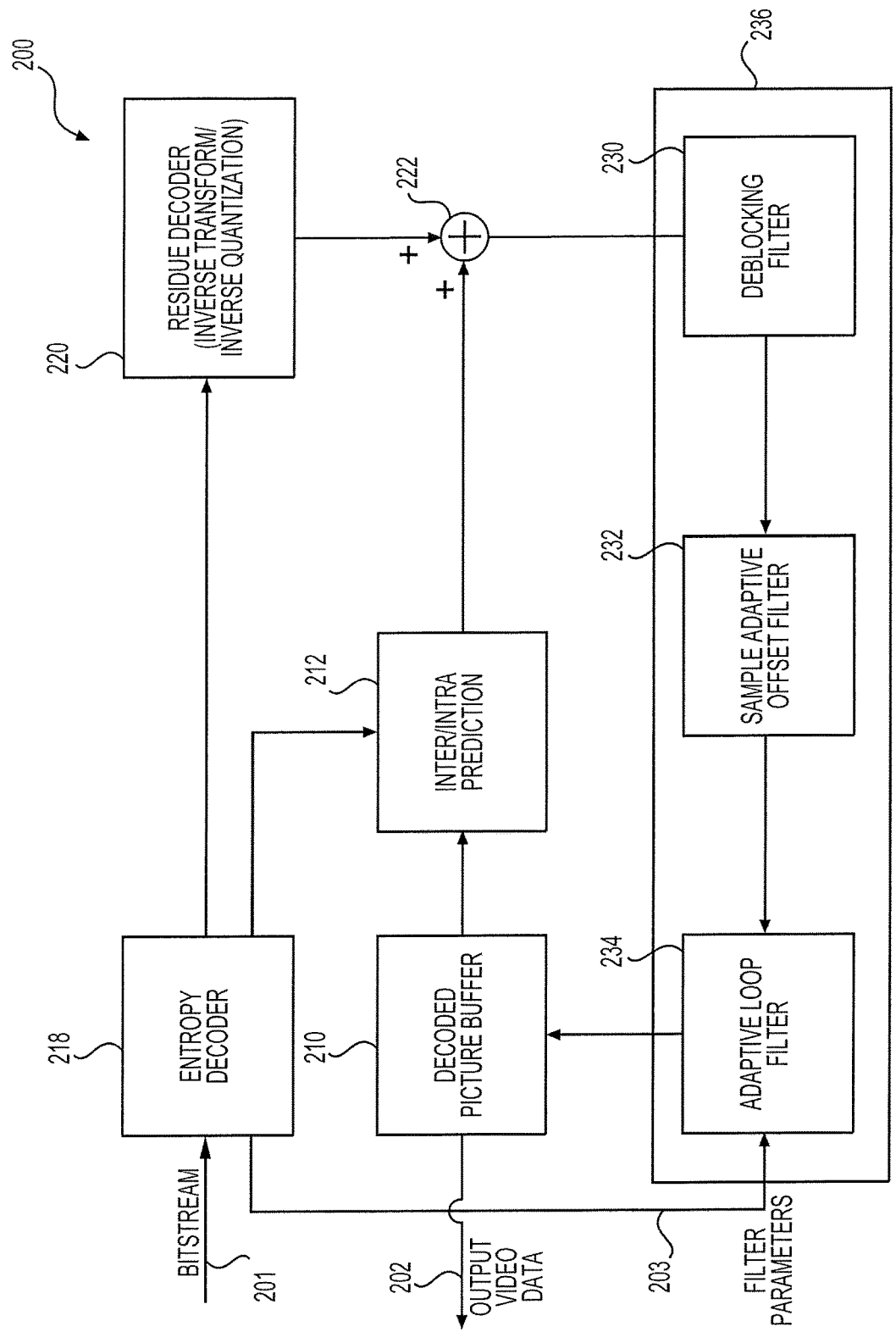
FIG. 2 shows a decoder according to an embodiment of the disclosure.

FIG. 2 shows a decoder 200 according to an embodiment of the disclosure. The decoder 200 includes an entropy decoder 218, a residue decoder 220, a decoded picture buffer 210, an inter-intra prediction module 212, an adder 222, a DF 230, an SAO 232, and an ALF 234. Those components are coupled together as shown in FIG. 2. The DF 230, the SAO 232, and the ALF 234 can form a filter pipeline 236.

In one example, the decoder 200 receives a bitstream 201 from an encoder, such as the bitstream 102 from the encoder 100, and performs a decompression process to generate output video data 202. The output video data 202 can include a sequence of pictures that can be displayed, for example, on a display device, such as a monitor, a touch screen, and the like.

The entropy decoder 218 receives the bitstream 201 and performs a decoding process which is an inverse process of the encoding process performed by the entropy encoder 118 in FIG. 1 example. As a result, compressed residues, prediction parameters, filter parameters 203, and the like, are obtained. The compressed resides are provided to the residue decoder 220, and the prediction parameters are provided to the inter-intra prediction module 212. The inter-intra prediction module 212 generates predictions of blocks of a picture based on the received prediction parameters, and provides the predictions to the adder 222. The decoded picture buffer 210 stores reference pictures useful for motion compensation performed at the inter-intra prediction module 212. The reference pictures, for example, can be formed by filtered blocks received from the ALF 134. In addition, reference pictures are obtained from the decoded picture buffer 210 and included in the picture video data 202 for displaying to a display device.

The residue decoder 220, the adder 222, the DF 230, and the SAO 232 are similar to the residue decoder 120, the second adder 122, the DF 130, and the SAO 132 in terms of functions and structures. Description of those components is omitted.

Similar to FIG. 1 example, the filter pipeline 236 can operate on a block-by-bock basis to process the reconstructed samples received from the adder 222. In addition, similar to the ALF 134 in FIG. 1 example, the ALF 234 can employ the block level processing techniques to operate on a block-by-block basis, and employ the data reuse techniques to reduce data access time of ALF processing performed for targeted pixels. Further, more than one filter pipelines similar to the pipeline 236 can be employed in alternative examples. Different from the ALF 134, the ALF 234 receives filter parameters from the entropy decoder 218 to perform an adaptive loop filtering process. For example, the filter parameters can include filter coefficients derived at the encoder 100, or filter indexes determined at the encoder 100. The ALF 234 can accordingly perform ALF processing for targeted pixels in respective blocks with the received coefficients or FIR filters indicated by the filter indexes.

The employment of the block level processing techniques in the ALFs 134 and 234 enables block-based pipeline processing in the filter pipelines 136 and 236. The block based pipeline processing can not only reduce work buffer sizes but also reduce processing delays in the sequence of filters. In addition, the employment of the data reuse techniques can increase operation speed of the ALFs 134 or 234 so that performance of the encoder 100 and decoder 200 can be further improved.

While the FIG. 1 and FIG. 2 examples show a series of filters 130-134, or 230-234 that are included in the encoder 100 or decoder 200, it is to be understood that fewer of such filters can be included in an encoder or decoder in other embodiments. In addition, although the ALFs 134 or 234 is typically arranged at the last stage of the sequence of filters, other positions of the ALFs 134 or 234 within the sequence of filters are possible. Those positions can be different from what is shown in the FIG. 1 or FIG. 2 examples.

In various embodiments, the ALF 134 or 234 can be implemented with hardware, software, or combination thereof. For example, the ALF 134 or 234 can be implemented with one or more integrated circuits (ICs), such as an application specific integrated circuit (ASIC), field programmable gate array (FPGA), and the like. For another example, the ALF 134 or 234 can be implemented as software or firmware including instructions stored in a computer readable non-volatile storage media. The instructions, when executed by a processing circuit, causing the processing circuit to perform functions of the ALF 134 or 234.

It is noted that the ALF 134 or 234 implementing the block level processing techniques and data reuse techniques disclosed herein can be included in other decoders or encoders that may have similar or different structures from what is shown in FIG. 1 or FIG. 2. In addition, the encoder 100 and decoder 200 can be included in a same device, or separate devices in various examples.

FIG. 3A shows a conventional picture level filter pipeline 300A. The filter pipeline 300A includes a first frame buffer 310, a DF 311, a second frame buffer 312, an SAO 313, a third frame buffer 314, and an ALF 315. The DF 311, the SAO 313, and the ALF 315 can have similar functions and structures as the DF 130, the SAO 132, and the ALF 134. However, the DF 311, the SAO 313, and the ALF 315 operate on a picture-by-picture basis.

FIG. 3B shows an example timing diagram 300B of the picture level filter pipeline 300A operating on a picture-by-picture basis. As shown, operations 331, 341, and 351 corresponding to each stage of the pipeline 300A (the DF 311, the SAO 313, and the ALF 315) are sequentially performed. Specifically, during time period T31, reconstruction operations 321-324 corresponding to different blocks, block a-block d, are sequentially performed. The different blocks, block a-block d, can be partitioned from a picture, for example, each corresponding to a CTU block. Reconstructed samples of the four blocks are stored at the first frame buffer 310. During time period T32, after the whole picture of reconstructed video data is received, the DF 311 can start to operate, and deblocking-filtered samples can be stored in the second frame buffer 312. During time period T33, the SAO 313 can start to operate, and SAO filtered samples can be stored in the third frame buffer 314. During time period T34, the ALF 315 can start to operate and adaptive-loop-filtered samples are generated. During the above process, the frame buffers 310, 312, and 314 each store a whole picture of reconstructed samples.

Figure 4A:
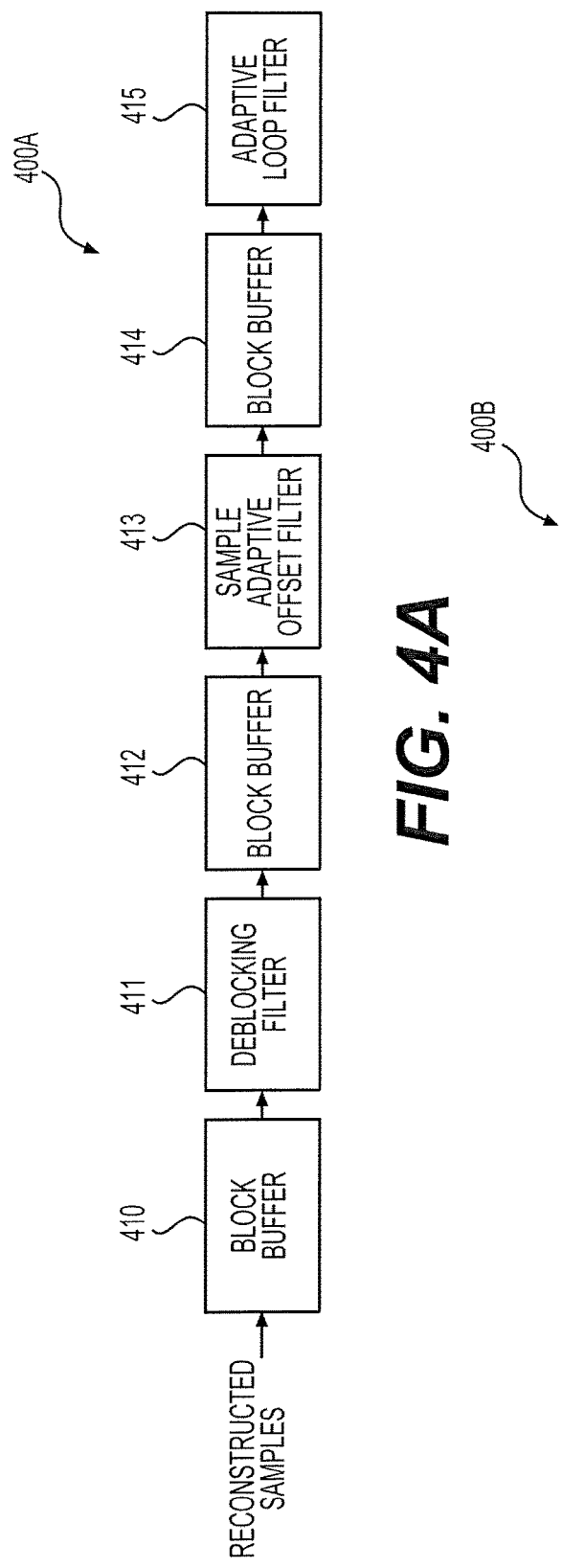
FIG. 4A shows a block level filter pipeline according to an embodiment of the disclosure.

FIG. 4A shows a block level filter pipeline 400A according to an embodiment of the disclosure. The filter pipeline 400A can be the filter pipeline 136 or 236, however, includes more details. The filter pipeline 400A includes a first block buffer 410, a DF 411, a second block buffer 412, an SAO 413, a third block buffer 414, and an ALF 415. The DF 411, the SAO 413, and the ALF 415 have similar structures or functions as the DF 130, the SAO 132, and the ALF 134 in FIG. 1 example, or the DF 230, the SAO 232, and the ALF 234 in FIG. 2 example. The filter pipeline 400A has three stages each corresponding to one of the three filters 411, 413, and 415. In addition, the DF 411, the SAO 413, and the ALF 415 operate on a block-by-block basis. Each of the buffers 410, 412 and 414 stores a block of samples instead of a whole picture of samples in FIG. 3A example. While the buffers 410, 412 and 414 are shown as components separate from the filters 411, 413, and 415 in FIG. 4A example, in other examples, the buffer 410, 412 or 414 can be integrated into the filter 411, 413, or 415.

Figure 4B:
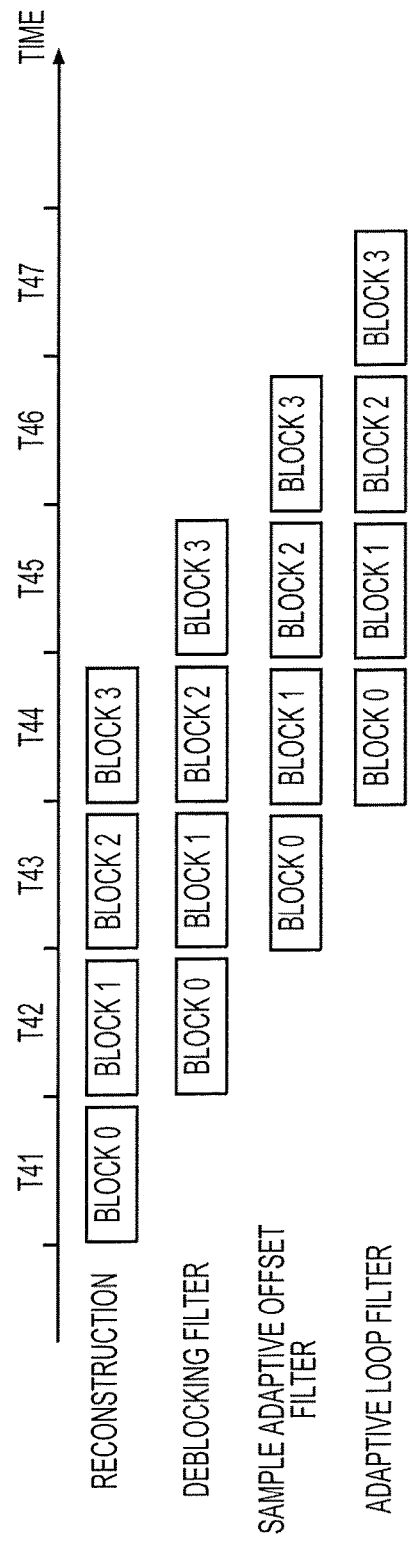
FIG. 4B shows an example timing diagram of a block level filter pipeline according to an embodiment of the disclosure.

FIG. 4B shows an example timing diagram 400B of the block level filter pipeline 400A according to an embodiment of the disclosure. In FIG. 4B example, a whole picture or a region of a picture is divided into four blocks, block 0-block 3. Each of the four blocks traverses the filter pipeline 400A and is processed by the DF 411, the SAO 413, and the ALF 415 successively. Specifically, during time period T41, reconstructed samples of block 0 are generated and subsequently stored in the block buffer 410. During time period T42, the DF 411 processes block 0 while block 1 is being reconstructed. The filtered block 0 is subsequently stored in the block buffer 412. During time period T43, the SAO 413 processes block 0. The filtered block 0 is subsequently stored in the block buffer 414. At the same time, the DF 411 is processing block 1, while block 2 is being reconstructed.

During time period T44, the ALF 415 starts to process block 0. At the same time, the DF 411 and the SAO 413 are processing blocks 2 and 1, while block 3 is being reconstructed. Similarly, during time periods T45-T47, blocks 1-3 can pass each stage of the filter pipeline 400A resulting in a sequence of processed blocks. As shown, during time periods T42-T46, one or more stages (filters) in the filter pipeline 400A operate in parallel. In contrast, only one stage (filter) in the filter pipeline 300A is in operation for any time period in FIG. 3B example. Accordingly, processing latency of the block level pipeline 400A has been reduced compared with the picture level pipeline 300A. In addition, the block buffers 410, 412 and 414 in the block level pipeline 400A can have a smaller buffer size than the frame buffers 310, 312 and 314 in the picture level pipeline 400B which is reduced from a whole picture to a block.

Figure 5:
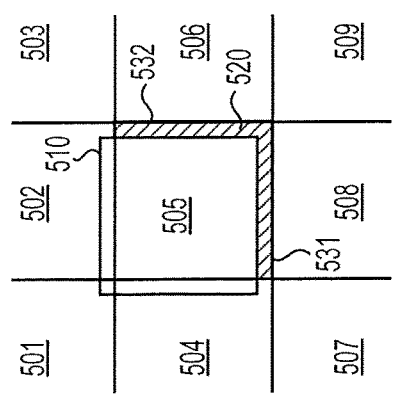
FIG. 5 shows an example of a deblocking filer and sample adaptive offset filter (DF/SAO) ready area according to an embodiment of the disclosure.

FIG. 5 shows an example of a DF/SAO ready area 510 according to an embodiment of the disclosure. In one example, the DF/SAO ready area 510, also referred to as the DF/SAO ready block, is an output of the SAO 132 in FIG. 1 example, and includes filtered samples successively processed by the DF 130 and the SAO 132. FIG. 5 shows multiple blocks (such as CTU blocks) 501-509 partitioned from a picture. Blocks partitioned from the picture including the multiple blocks 501-509 are processed one by one in the encoder 100 in a raster scan order, for example, row by row from left to right. Blocks of reconstructed samples are generated from the second adder 122 and received at the filter pipeline 136 one by one in the same order.

In one example, the blocks 501-505 has been processed by the SAO 132, while the blocks 506-509 are to be processed by the SAO 132. The DF/SAO ready area 510 is an output of the SAO 132, and will be provided to the ALF 134 for further processing. As shown, due to the deblocking processing and the SAO processing, the DF/SAO ready area 510 can be shifted up and left for several lines of pixels with respect to the block 505. For example, when processing the block 505 of reconstructed samples, the DF 130 needs reconstructed samples from the block 508 in order to perform deblocking filtering of a bottom horizontal block boundary 531. However, the reconstructed samples of the block 508 to the bottom of the block 505 are not available until the block 508 is reconstructed. Accordingly, a few rows of reconstructed samples near the boundary 531 in the shaded area 520 cannot be processed. Similarly, because reconstructed samples near a right vertical block boundary 532 in the block 506 are not available yet, a few columns of reconstructed samples near the block boundary 532 in the shaded area 520 cannot be processed by the DF 130. Likewise, since SAO filtering is applied after the deblocking processing, SAO filtering cannot be performed on the samples in the shaded area 520 when the block 505 is processed at the SAO 132.

The samples in the shaded area 520 can be stored in a buffer at the DF 130, and later processed when samples in the blocks 506 or 508 are available. As a result of the above process, the output area of the SAO 132 can be the shifted area 510 as shown in FIG. 5. Typically, a DF/SAO ready area can be configured to have a same size as the blocks 501-509 such that processing time at each stage of the filter pipeline can be balanced.

While a DF/SAO ready area or block in the above examples is generated from a filter pipe line including a DF and a SAO, it is to be understood that, on other examples, a DF/SAO ready area can refer to a block generated from a filter pipeline that includes one of a DF or SAO, or include a filter different from a DF or SAO. Such a block is taken as an input at a ALF, and processed by the ALF using various techniques described herein.

Figure 6:
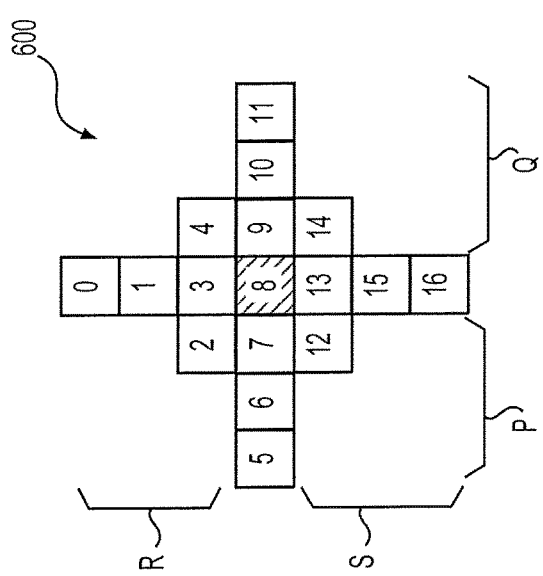
FIG. 6 shows a filter shape of a finite impulse response (FIR) filer according to an embodiment of the disclosure.

FIG. 6 shows a filter shape 600 of an FIR filer according to an embodiment of the disclosure. The FIR filter having the filter shape 600 can be used at the ALF 134 or 234 to generate a filtered sample of a target pixel. The filter shape 600 has 17 squares. Each square is indexed by a number, i. Each square i corresponds to a to-be-filtered sample Si corresponding to a pixel Pi. Each square i is associated with a filter coefficient Ci. Accordingly, as defined by the filter shape 600, pixel P8 (shaded square in FIG. 6) is the target pixel (also referred to as target sample) and a filtered sample of the target pixel P8, represented by St(P8), can be calculated using the following expression, $$St(P8)=\Sigma_{i=0}^{16}C_i \cdot S_i \qquad (2)$$

The to-be-filtered pixels P0-P16 or samples S0-S16 form a to-be-filtered area (also referred to as a filter input area) in FIG. 6. The to-be-filtered area includes rows or columns of samples. The number of columns between the target pixel P8 and the right border of the to-be-filtered area is referred to as a right span of the filter shape 600 or the filter having the filter shape 600. The right span is represented as Q in FIG. 6. Alternatively, the right span can also be defined as the number of pixels to the right of the target pixel in the to-be-filtered area. Similarly, a left span, P, a lower span, S, and an upper span, R, can also be defined. The left span refers to the number of columns between the target pixel P8 and the left border of the to-be-filtered area; the lower span refers to the number of rows between the target pixel P8 and the bottom border of the to-be-filtered area; the upper span refers to the number of rows between the target pixel P8 and the top border of the to-be-filtered area. The left, lower, and upper spans P, S, and R are also shown in FIG. 6.

While the filter shape 600 is shown as a 7×7 cross shape overlapping a 3×3 square shape, it is to be understood that FIR filters employed in the ALF 134 or 234 can have various shapes and sizes in various example. For example, filter shapes can be a square shape, a diamond shape, and the like, and can with different sizes.

Figure 7A:
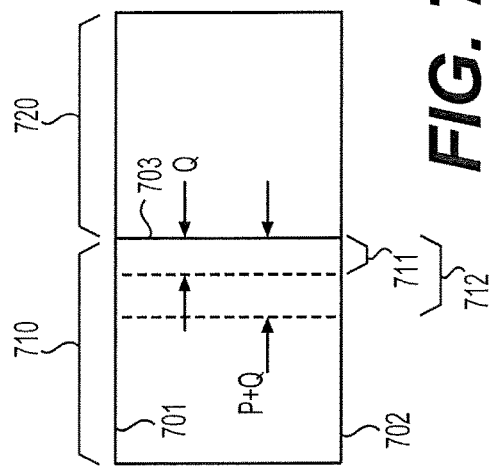
FIGS. 7A-7B show a first block level processing technique according to an embodiment of the disclosure.
Figure 7B:
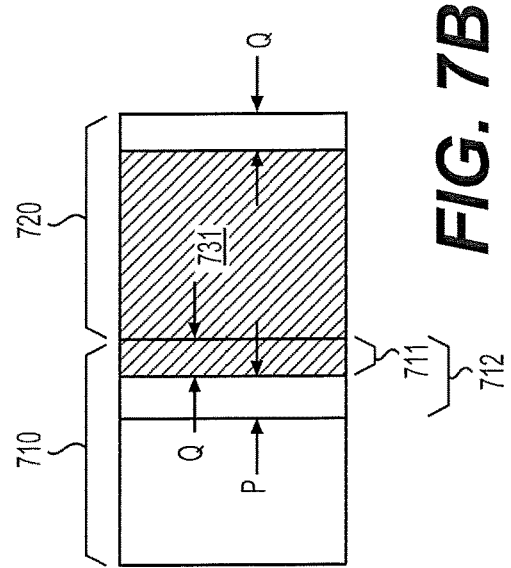

FIGS. 7A-7B show a first block level processing technique according to an embodiment of the disclosure. FIG. 7A shows two DF/SAO ready blocks 710-720. The two blocks 710-720 are similar to the DF/SAO ready block 510 in FIG. 5 example and can be sequentially generated from the SAO 413 in the filter pipeline 400A. In one example, the block 710 is first generated and stored in a first buffer in the block buffer 414. The ALF 415 uses the FIR filter defined by the filter shape 600 to process the block 710. As shown in FIG. 6, ALF processing for the target pixel P8 needs the right Q columns and the left P columns of samples to be available. Accordingly, in FIG. 7A, the rightmost Q columns of samples in a block 711 in the block 710 cannot be processed with the FIR filter as target pixels until the next block 720 is available. To solve this problem, in one example, the ALF 415 is configured to store the rightmost Q columns of samples in the block 711, for example, in a second buffer (also referred to as a side buffer) in the block buffer 414. In addition, the ALF 415 can further store the P columns of samples to the left of the block 711 into the second buffer in the block buffer 414. The P columns of samples will be needed when the samples in the block 711 are being processed. As a result, totally P+Q columns of samples in a block 712 are stored in the side buffer.

When the next DF/SAO ready block 720 is generated and received at the first buffer of the block buffer 414, the block 712 is combined with the block 720 to form a to-be-filtered area. In FIG. 7B, when processing the to-be-filtered area, pixels within the shaded area 731 (including the block 711) can be processed as target pixels. However, pixels within the rightmost Q columns cannot be processed as target pixels until a next DF/SAO ready block to the right of the block 720 is available.

In the above example of FIGS. 7A-7B, the first block level processing technique for handling samples near a block boundary is not applied to samples near the upper boundary 701 and lower boundary 702 in the blocks 710 and 720 as shown in FIG. 7A. Instead, in one example, when processing samples near the upper and lower boundaries 701-702, modified filter shapes can be employed to avoid filtering samples in rows of blocks above or below the blocks 710-720. In this way, buffers required for storing samples in multiple blocks in the row above the blocks 710-720 can be avoided. Such a modification of a filter shape is referred to as a conditional transform of the filter. For example, when processing samples near the upper boundaries 701, the filter shape 600 in FIG. 6 can be modified in such a way that samples 0-4 of the upper portion of the filter shape 600 can be ignored, or sample 2 can be replaced by sample 7; sample 0, 1 and 3 replaced by sample 8; and sample 4 replaced by sample 9. As a result, ALF processing with the modified filter shape for the target sample 8 does not need samples above the target sample 8.

Figure 8:
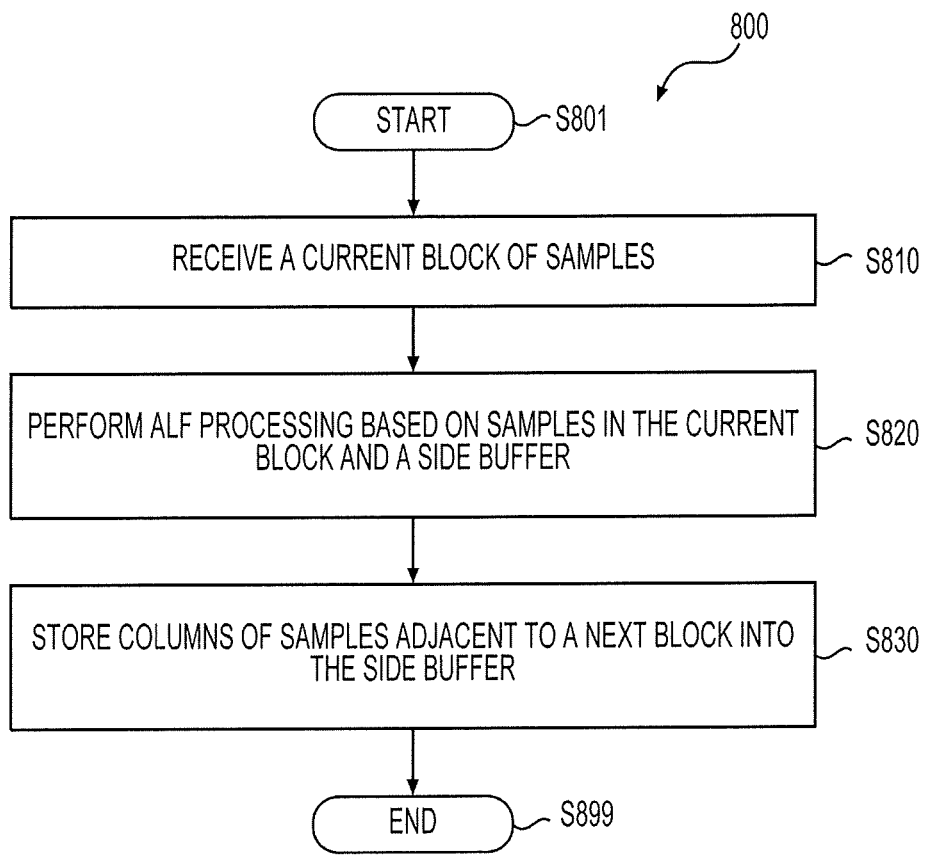
FIG. 8 shows an adaptive loop filtering process according to an embodiment of the disclosure.

FIG. 8 shows an adaptive loop filtering process 800 according to an embodiment of the disclosure. The process 800 uses the first block level processing technique described in FIGS. 7A-7B example. The process 800 can be performed at the ALF 134, 234, or 415. The ALF 415 in the filter pipeline 400A is used as an example for explanation of the process 800 with reference to FIGS. 7A-7B. The process 800 starts from S801 and proceeds to S810.

At S810, the current block 720 (in FIG. 7B) of samples are received at the ALF 415 and stored in the first buffer of the block buffer 414. The current block 720 of samples can be one of a sequence of blocks in a picture. The sequence of blocks in the picture can be processed in a horizontal scan order or a vertical scan order. The sequence of blocks can be sequentially processed by the filter pipeline 400A. The current block 720 of samples can be a DF/SAO ready block generated from the SAO 413.

At S820, ALF processing is performed for target pixels based on samples in the current block 720 and samples in the block 712 in FIG. 7B. The block 712 of samples can be stored in the second buffer (the side buffer) of the block buffer 414. The block 712 can include Q+P columns of pixels adjacent to the current block 720 within the previous block 710. The target pixels under processing are pixels within the block 731. As shown in FIG. 7B, the block 731 includes samples in the blocks 720 and 712 excluding the rightmost Q columns and the leftmost P columns of pixels within the blocks 720 and 712.

At S830, Q+P columns of samples adjacent to a next block (not shown) within the current block 720 are stored into the side buffer. In FIG. 7B example, the next block is to the right of the block 720. However, in other examples, positions of a previous or next block with respect to the current block 720 can be different from FIG. 7B example depending on a processing order of blocks in a picture. For example, a previous block may be to the right of the current block 720 while a next block may be to the left of the current block 720.

In other examples, it is possible that the current block 720 is a last block in a scan row or a scan column. Accordingly, at S830, the storage of the right most Q+P columns of samples to the side buffer is not performed. Instead, the right most Q columns can be processed with a modified filter shape. In addition, in other examples, it is possible that the block 720 is a first block in a scan two or a scan column. Accordingly, there is no block 712 available. Similarly, a modified filter shape can be employed to process target samples near the left boundary of the current block 720.

Figure 9A:
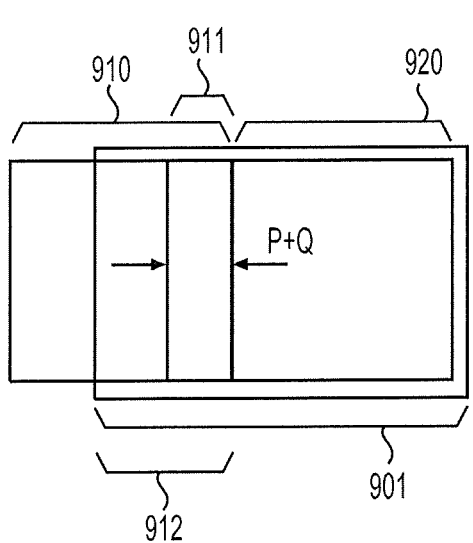
FIGS. 9A-9B shows a second block level processing technique according to an embodiment of the disclosure.
Figure 9B:
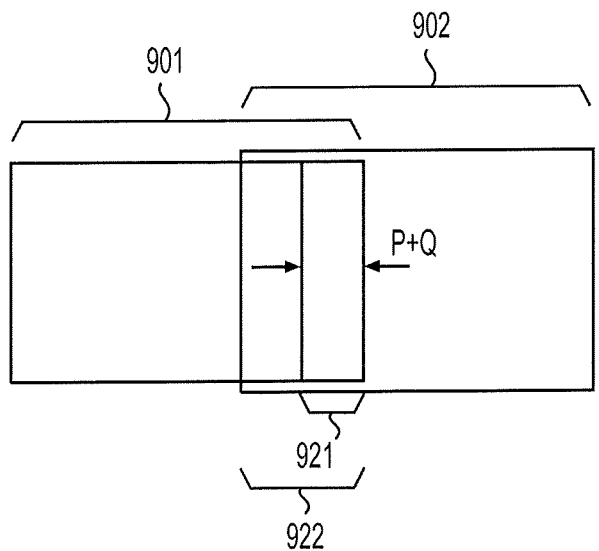

FIGS. 9A-9B shows a second block level processing technique according to an embodiment of the disclosure. FIG. 9A shows two adjacent DF/SAO ready blocks 910-920 which are generated in a way similar to the DF/SAO block 510. In one example, the DF/SAO ready blocks 910-920 are sequentially generated by the SAO 413 at the filter pipeline 400A. However, different from the FIGS. 7A-7B example, the SAO 413 does not output the DF/SAO ready block 920 as its output area. Instead, the SAO 413 outputs an extended block 901 as the output area. The extended block 901 includes the DF/SAO ready area 920 and a portion of the previous DF/SAO ready block 910 in a block 912. The block 912 includes at least the P+Q columns of samples in a block 911 that are the columns of samples closest to the extended area 901 (or the DF/SAO block 920) within the DF/SAO block 910. The block 911 and the block 920 can form a to-be-filtered area that is similar to the to-be-filtered area (the block 720 plus the block 712) described in FIG. 7B example. Subsequently, the extended area 901 can be stored to the block buffer 414 and processed by the ALF 415.

FIG. 9B shows the extended area 901 and a second extended area 902 neighboring the first extended area 901. The second extended area 902 can be outputted from the SAO 413 in the filter pipeline 400A after the first extended area is outputted. The two extended areas 901 and 902 can overlap each other. The overlapping area may include the P+Q columns of samples within the first extended area that is closest to the second extended area 902.

Figures 10A, 10B:
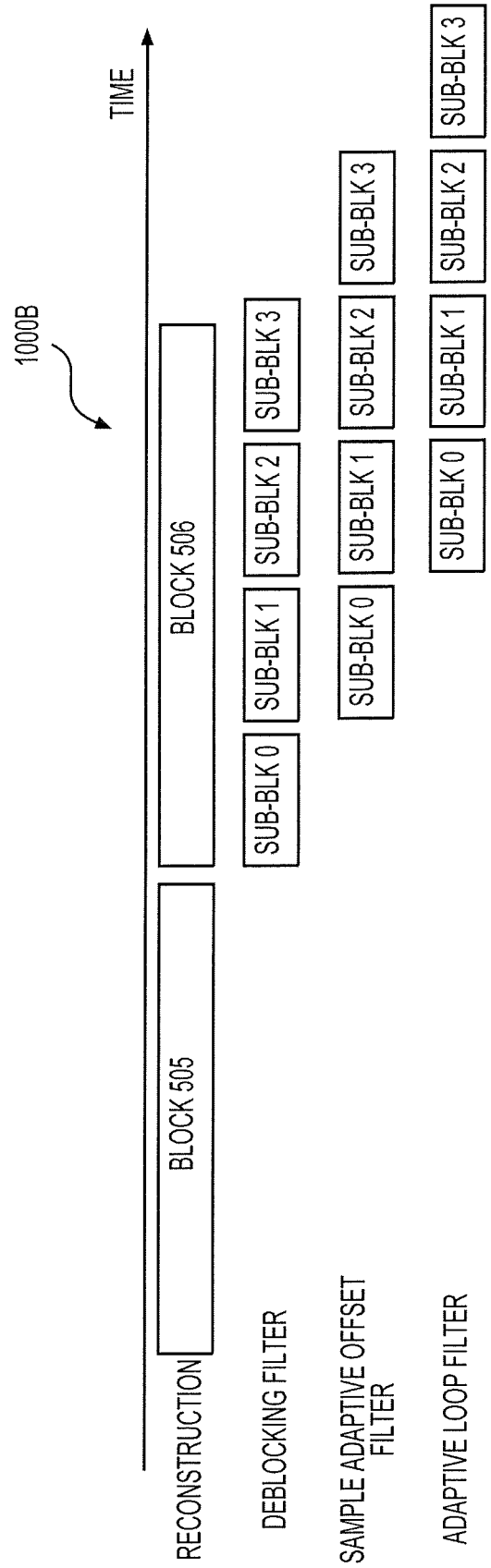
FIG. 10A shows a group of blocks according to an embodiment of the disclosure.
FIG. 10B shows an example timing diagram of a sub-block level filtering process according to an embodiment of the disclosure.

FIG. 10A shows the same group of blocks 501-509 as shown in FIG. 5 example. However, different from FIG. 5 example, after each block 501-509 is processed in the encoder 100 and reconstructed video data of the blocks 501-509 are generated, each block 501-509 is divided into multiple sub-blocks for filtering processes at the filter pipeline 136, 236 or 400A. As shown in FIG. 10A, the block 505 is divided into four sub-blocks 0-3 for the subsequent filtering process. In one example, the group of blocks 501-509 are a group of blocks corresponding to a CTU partition, and each block 501-509 corresponds to a CTU.

FIG. 10B shows an example timing diagram 1000B of a sub-block level filtering process according to an embodiment of the disclosure. The timing diagram 1000B corresponds to the sub-block partition in FIG. 10A example. As shown, the sequence of blocks (blocks 505-506) are processed, for example, at the encoder 100, and blocks of reconstructed samples are sequentially generated. After the reconstructed video data of the block 505 is received at the block buffer 410 of the filter pipeline 400A, for example, the DF 411 processes the deblocking filtering process sub-block by sub-block. As shown, sub-blocks 0-3 are sequentially processed. Each sub-block is provided to the SAO 413 for processing, for example, once the respective deblocking process is completed. Accordingly, the SAO 413 performs SAO processing sub-block by sub-block to generate DF/SAO ready sub-blocks as shown. Subsequently, the ALF 415 processes the DF/SAO ready sub-blocks one by one. Compared with the block level pipeline processing in FIG. 4B example, sub-block level pipeline processing can further reduce processing delay and reduce work buffer size from a block of samples to a sub-block of samples in a filter pipeline. As shown in FIG. 10B, the ALF 415 starts to process samples in the block 505 before the DF 411 or the SAO 413 completes their processing for samples in the block 505. Accordingly, the ALF 415 processes the sub-blocks 0-1 in parallel with the DF 411 processing the sub-blocks 2-3, and the SAO 413 processing the sub-blocks 1-2.

In other examples, the processing order of sub-blocks at the DF 411 and SAO 413 can be different from the order at the ALF 415. For examples, the sub-blocks 0-3 can be processed in an order of 0-2-1-3 at the DF 411 and SAO 413, while the same sub-blocks 0-3 can be processed in another order of 0-1-2-3. In addition, in some examples, partition of sub-blocks at the DF 411 and SAO 413 can be different from that at the ALF 415. For example, for DF 411 and SAO 413, sub-blocks 0-1 can be processed as one block, and sub-blocks 2-3 can be processed as another bock. In contrast, for ALF 415, the sub-blocks 0-3 can be processed separately.

FIGS. 11A-11B show a third block level processing technique according to an embodiment of the disclosure. The third block level processing technique enables the sub-block level pipeline processing in FIGS. 10A-10B examples. The filter pipeline 400A is used as an example for explanation of the third block level processing technique. FIG. 11A show a sequence of DF/SAO ready sub-blocks 1101-1116 generated from the SAO 413 at the filter pipeline 400A with its own processing order and subsequently processed at the ALF 415 sub-block by sub-block. The sequence of DF/SAO ready sub-blocks 1101-1116 can each correspond to one of a sequence of sub-blocks partitioned from a block, such as one of the bocks 501-509. As shown, the sequence of sub-blocks 1101-1116 are arranged in four rows 1121-1124 and four columns 1131-1134, and are processed in a horizontal scan order, for example, from left to right and from top to bottom.

In order to process the sub-blocks 1101-1116, the block buffer 414 can be configured to include a first buffer, a second buffer 1141 (referred to as a top buffer), and a third buffer 1142 (referred to as a left buffer). The first buffer can be used for storing one of the sub-blocks 1101-1116 received from the SAO 413. The top buffer 1141 can be used for storing bottom R+S rows of samples in the sub-blocks of one of the rows 1121-1124. The left buffer 1142 can be used for storing the rightmost P+Q columns of samples of a sub-block in one of the rows 1121-1124

For example, the ALF 415 processes the sub-blocks 1101-1104 one by one during an adaptive filtering process. The ALF 415 can first process the sub-block 1101. As described above, the rightmost Q columns of samples cannot be processed due to unavailability of the next sub-block 1102, and the bottom S columns of samples cannot be processed due to unavailability of the next row sub-block 1105, assuming the FIR filter of FIG. 6 is used. Accordingly, after the sub-block 1101 is processed, the ALF 415 can store the bottom R+S rows of samples in the sub-block 1101 into the top buffer 1141, and stores the rightmost P+Q columns of samples in the sub-block 1101 into the left buffer 1142.

Then, the ALF 415 can proceed to process the sub-block 1102. The rightmost P+Q columns of samples in the sub-block 1101 stored in the left buffer 1142 can then be combined with the sub-block 1102 for respective ALF processing. After the sub-block 1102 is processed, the ALF 415 can store the bottom R+S rows of samples in the sub-block 1102 into the top buffer 1141, and stores the rightmost P+Q columns of samples in the sub-block 1102 into the left buffer 1142 which replace the previously stored P+Q columns of samples in the sub-block 1102. In a similar way, sub-blocks 1103-1104 can be processed. As a result, the top buffer 1141 can now store R+S bottom rows of samples of the sub-blocks 1101-1104, while the rightmost P+Q columns of samples of 1104 are stored in the left buffer 1142.

In a similar way, the sub-blocks 1105-1116 can be subsequently processed by the ALF 415. During the process, bottom R+S rows of samples in a row stored in the top buffer can be utilized for processing sub-blocks in an adjacent next row. At the same time, bottom R+S rows of samples in the adjacent next row can replace the bottom R+S rows of samples in the above row. In one example, the storage of bottom R+Q rows of samples is not performed for the last row 1124. In addition, after ALF processing is performed on all the sub-blocks 1101-1116, the rightmost P+Q columns of samples in sub-blocks 1104, 1108, 1112, and 1116 in the rightmost columns 1134 are stored in the left buffer 1142. The samples in the left buffer 1142 can then be kept for processing a next group of DF/SAO ready sub-blocks to the right of the current DF/SAO ready sub-blocks 1101-1116.

FIG. 11B shows the same sequence of DF/SAO ready sub-blocks 1101-1116 as shown in FIG. 11A, which, however, are processed in a vertical scan order, for example, from top to bottom and from left to right. In FIG. 11B example, a top buffer 1151 and a left buffer 1152 can be employed. However, the size of the top buffer 1151 is further reduced compared with the top buffer 1141. Specifically, during an adaptive filtering process where the sub-blocks 1101-1116 are processed in the vertical scan order, the top buffer 1151 can be used for storing bottom R+S rows of samples of a sub-block in one f the columns 1131-1134. The left buffer 1152 can be used in a way similar to the left buffer 1142 for storing the rightmost P+Q columns of samples of respective sub-blocks. At the end of the adaptive filtering process, the samples in the left buffer 1142 can similarly be kept for processing a next group of DF/SAO ready sub-blocks to the right of the current DF/SAO ready sub-blocks 1101-1106.

In other examples, an processing order of the sub-blocks may be different from that of FIGS. 11A-11B. For example, the sub-blocks may be processed in a zig-zag order. However, the methods described with reference to FIGS. 11A-11B can also be applicable.

Figure 12:
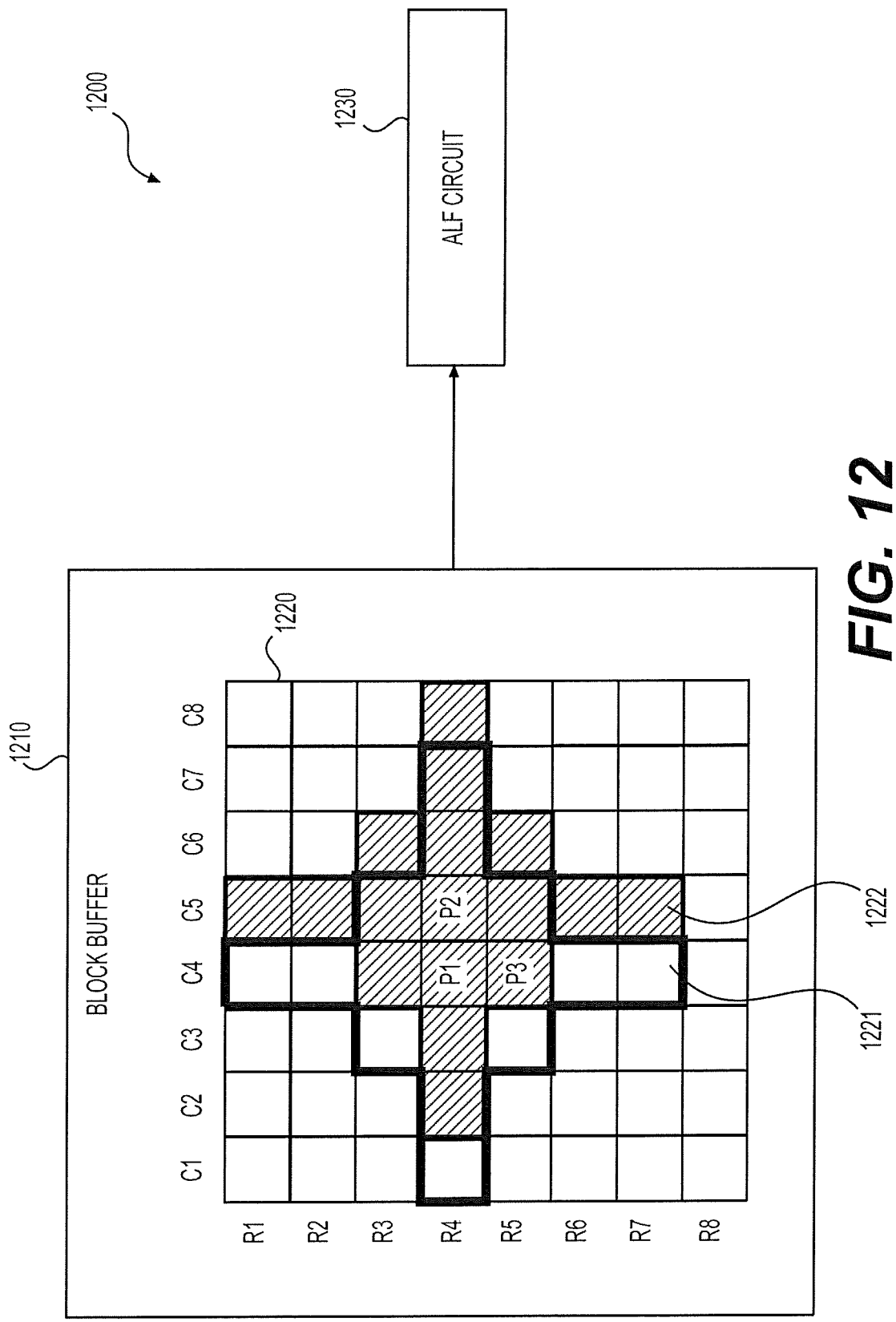
FIG. 12 shows an adaptive loop filter (ALF) according to an embodiment of the disclosure

FIG. 12 shows an ALF 1200 according to an embodiment of the disclosure. The ALF 1200 can employ a one dimensional (1D) or a two dimensional (2D) data reuse technique to reduce data access time. The ALF 1200 can include a block buffer 1210 and an ALF circuit 1230. The block buffer 1210 is configured to store pre-ALF data. The pre-ALF data can include a DF/SAO ready block currently being processed, and one or more side buffers (such as a top buffer, left buffer, or the like) for storing the P+Q columns or R+S rows of samples from a previous DF/SAO ready block as described above. As an example, the block buffer 1210 includes a block 1220 of pre-ALF data. The ALF circuit 1230 is configured to receive samples from the block buffer 1210 and perform ALF processing for target pixels in the block 1220. Assume the ALF circuit 1230 uses an FIR filter having the filter shape shown in FIG. 6. Accordingly, during ALF processing for a target pixel, the FIR filter is applied to samples of pixels within a to-be-filtered area surrounding the target pixel, and a filtered sample can be calculated based on the expression (2).

In one example, the ALF 1230 uses the 1D data reuse technique to calculate filtered samples for two adjacent pixels, P1 and P2, as labeled in FIG. 12. The two pixels are distributed along the vertical dimension. As shown, neighboring samples for ALF processing for the pixel P1 are within an area 1221 surrounded by a thickened solid line, while neighboring samples for ALF processing for the pixel P2 are within a shaded area 1222. In a first scenario, samples in the block 1220 are read from the block buffer 1210 row by row (row scan), and samples in columns of C1-C8 in rows of R1-R7 are received at the ALF circuit. Based on the received samples, the ALF circuit 1230 can calculate two filtered samples corresponding to the samples P1 and P2. Assuming reading one row or columns of samples from the block buffer 1210 takes one clock cycle, seven clock cycles are needed for accessing neighboring samples of the two pixels, P1 and P2. In a second scenario, samples in the block 1220 can be read from the block buffer 1210 column by column (column scan). Accordingly, access to samples in rows of R1-R7 and columns of C1-C8 can take eight clock cycles.

In another example, ALF 1230 uses the 2D data reuse technique to calculate filtered samples for three adjacent pixels, P1, P2, and P3, as labeled in FIG. 12. The three target pixels are distributed at two dimensions: the horizontal dimension and the vertical dimension. Specifically, samples in columns of C1-C8 and rows of R1-R8 can be read from the block buffer 1210 by either row scan or column scan. The ALF circuit 1230 can calculate three filtered samples for the target pixels P1, P2, and P3 based on the obtained samples. Accordingly, it takes eight clock cycles to obtain samples for ALF processing for three target pixels.

Figure 13:
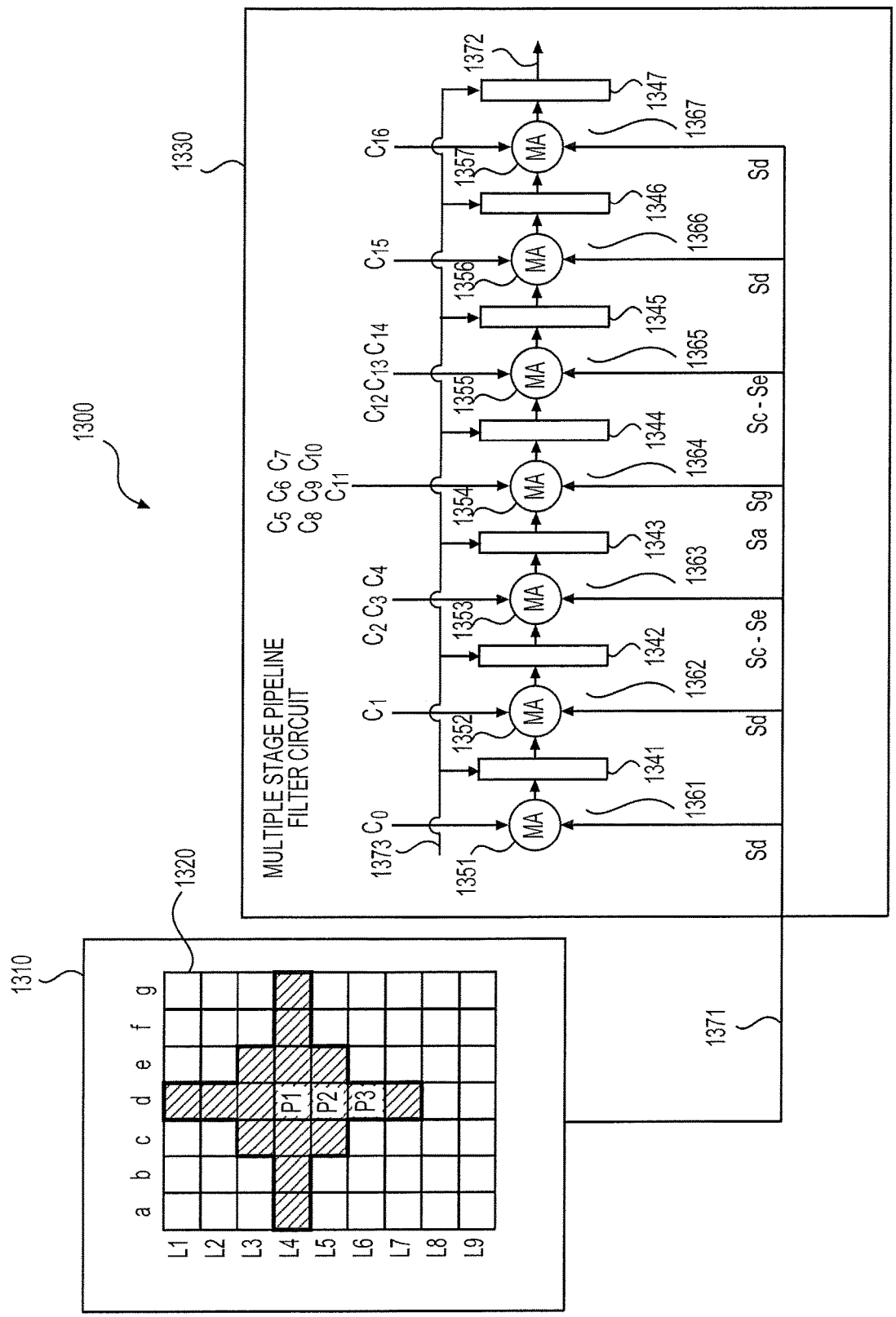
FIG. 13 shows a first ALF according to an embodiment of the disclosure.

FIG. 13 shows a first ALF 1300 according to an embodiment of the disclosure. The ALF 1300 implements the 1D data reuse technique. The ALF 1300 includes a block buffer 1310, and a multiple stage pipeline filter (MSPF) circuit 1330. The block buffer 1310 is configured to store a block 1320 of pre-ALF data. The MSPF circuit 1330 implements an FIR filter that has a filter shape of FIG. 6 and a left, right, upper and lower span of P, Q, R and S. Specifically, the MSPF 1330 has R+S+1=7 stages 1361-1367. Each stage includes a multiply-add (MA) circuit 1351-1357, and a delay element 1341-1347. Each delay element 1341-1347 can be a shift register, or other type of circuit, and when triggered by a control clock signal 1373, can store an output of an MA circuit 1351-1357 and output the stored value to a next stage.

As shown, each MA circuit 1351-1357 can take one or more samples from an input line 1371 as a first input and one or more filter coefficients as a second input, and calculate a sum of products of respective samples and filter coefficients, accordingly. In addition, at each MA circuit of the stages 1362-1367, a sum calculated from a previous stage can be taken as a third input and be added to the sum of products. For example, the MA circuit 1351-1357 at each stage 1361-1367 can perform the calculation according to the following expressions,

| | |
|---|---|
| $Sd \times C0$; | Stage 1361: |
| $Sd \times C1 + \text{Sum 1}$; | Stage 1362: |
| $Sc \times C2 + Sd \times C3 + Se \times C4 + \text{Sum 2}$; | Stage 1363: |
| $Sa \times C5 + Sb \times C6 + Sc \times C7 + Sd \times C8 + Se \times C9 + Sf \times C10 + Sg \times C11 + \text{Sum 3}$; | Stage 1364: |
| $Sc \times C12 + Sd \times C13 + Se \times C14 + \text{Sum 4}$; | Stage 1365: |
| $Sd \times C15 + \text{Sum 5}$; | Stage 1366: |
| $Sd \times C16 + \text{Sum 6}$. | Stage 1367: |

In the above expressions, C1-C16 are filter coefficients correspond to the filter shape of FIG. 6. Sa-Sg represents samples in columns a-g, respectively, in one of lines, L1-L9, read from the pre-ALF data block 1320. Sum 1 to Sum 6 each corresponds to an output of a MA circuit at a previous stage.

In operation, samples are read from the blocks 1320 line by line in synchronize with the clock signal 1373. During each reading operation, a line of P+Q+1 samples Sa-Sg are provided to the input line 1371. Accordingly, each MA circuit 1351-1357 calculates a sum based on two (the first stage 1361) or three (the stages 1362-1367) inputs. The sum is provided to each respective delay element 1341-1347 as input. Then, triggered by the clock signal 1373, the calculated sum at each stage is shifted-in to a next adjacent stage as an input to the MA circuit at the next stage. Next, a next line of samples Sa-Sg can be provided to the input line 1371. Similarly, a sum can be obtained at each stage with current samples on the input lines 1371 and a sum outputted from a previous stage. Subsequently, the newly calculated sum can be shifted-in to a next stage when triggered by the clock signal 1373.

Accordingly, when samples in lines of L1-L7 are received at the input line 1371 line by line, a filtered sample corresponding to a target pixel P1 can be obtained at an output 1372 of the MSPF circuit 1330. When one more line (L8) of samples are further provided, a filtered sample corresponding to a target pixel P2 can be obtained at the output 1372. When input of samples is continued line by line along the vertical direction in the block 1320, target pixels below the pixel P2 (such as P3) in column d can be successively obtained.

Figure 14:
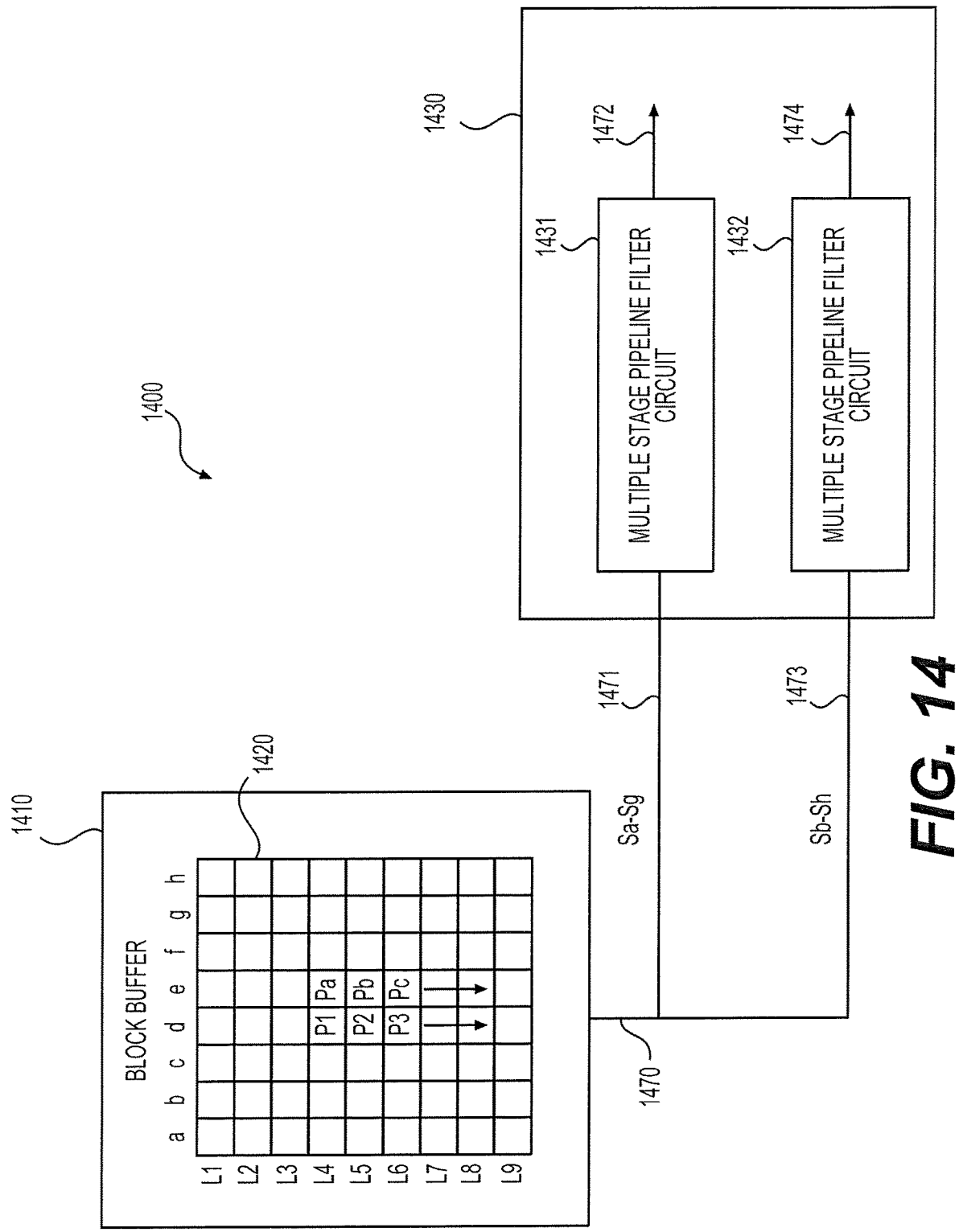
FIG. 14 shows a second ALF according to an embodiment of the disclosure.

FIG. 14 shows a second ALF 1400 according to an embodiment of the disclosure. The ALF 1400 implement the 2D data reuse technique. The second ALF 1400 includes a block buffer 1410 and a filter circuit 1430. The block buffer 1410 is similar to the block buffer 1310, and is configured to store pre-ALF data. As shown, a block 1420 of pre-ALF samples are stored in the block buffer 1410. The filter circuit 1430 is configured to receive samples from the block buffer 1410 to perform ALF processing for target pixels in the block 1420. The FIR filter of FIG. 6 is used for the ALF processing. The filter circuit 1430 includes two sets of MSPF circuits 1431-1432. Each of the MSPF circuits 1431-1432 can be similar to the MSPF circuit 1330 in FIG. 13 examples in terms of functions and structures.

In operation, samples are read from the block 1420 line by line and applied to an input line 1470 coupled to the filter circuit 1430. However, each line of samples includes P+Q+2 samples in column a-h. In addition, at an input line 1471 to the first MSPF circuit 1431, samples Sa-Sg are received and provided to the first MSPF circuit 1431. In contrast, at an input line 1473 to the second MSPF circuit 1432, samples Sb-Sh are received and provided to the second MSPF circuit 1432. Accordingly, as samples Sa-Sh are continually received line by line at the filter circuit 1430, a first column of target pixels, such as pixels P1-P3, and a second column of target pixels, such as pixels Pa-Pc, can be obtained in parallel from outputs 1472 and 1474, respectively.

While two MSPF circuits are shown in FIG. 14 example to realize 2D data reuse, it is to be understood that more than two MSPF circuits can be employed in other examples. For example, N number of MSPF circuits can be included in the filter circuit 1430 operating in parallel, and each line of samples read from the block 1420 can include P+Q+N number of samples. Accordingly, filtered samples of N columns of target pixels neighboring each other in horizontal direction in FIG. 14 example can be obtained in parallel as a result of the above adaptive loop filtering process.

Figure 15:
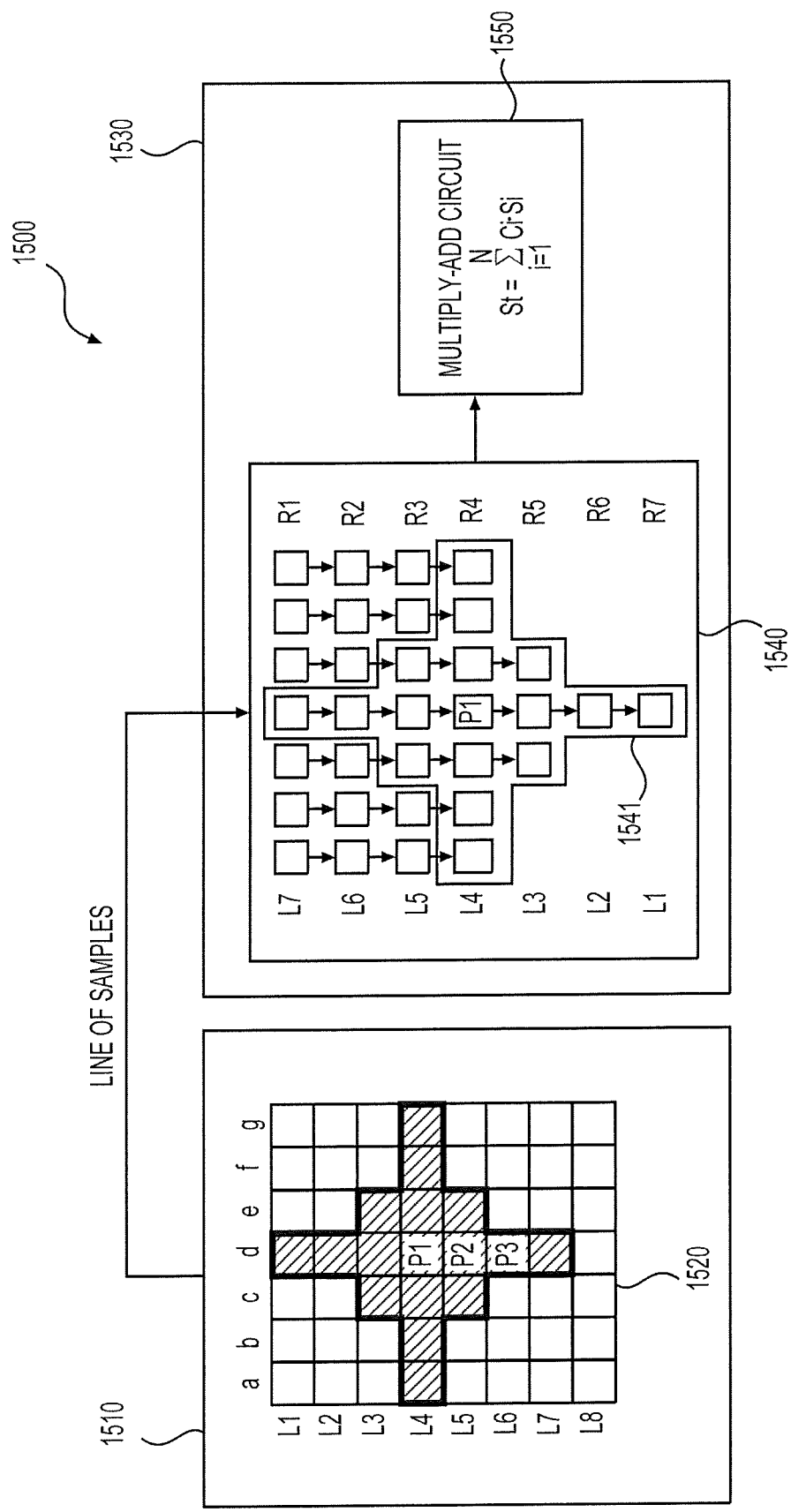
FIG. 15 shows a third ALF according to an embodiment of the disclosure.

FIG. 15 shows a third ALF 1500 according to an embodiment of the disclosure. The ALF 1500 implements the 1D data reuse technique. The ALF 1500 can include a block buffer 1510 and a filter circuit 1530. The block buffer 1510 is similar to the block buffers 1310 or 1410, and is configured to store pre-ALF data. As shown, a block 1520 of samples are stored in the block buffer 1510. The filter circuit 1530 is configured to receive samples from the block buffer 1510 and perform ALF processing for target pixels in the block 1520. In one example, the FIR filter of FIG. 6 is used. The filter circuit 1530 can include a register array 1540 and a multiply-add (MA) circuit 1550.

The register array 1540 is configured to store lines of samples received from the block buffer 1510. Specifically, the register array 1540 can include R+S+1 rows of shift registers, labeled as R1-R7. In one example, each row of the first S+1=4 rows, R1-R4, include P+Q+1=7 registers, while rows R5-R7 each include a number of registers consistent with the number of neighboring samples in a respective row in the upper portion of the filter shape 600. Controlled by a clock signal, samples stored in each row of registers can be shifted in to a next row of shift registers. In this way, samples can be received at input of shift registers in the row R1 line by line and pushed down to lower level registers line by line.

The MA circuit 1550 is configured to receive samples from the register array 1540, and calculate a filtered sample accordingly. For example, corresponding to the filter of FIG. 6, the MA circuit 1550 can perform a calculation with the expression (2) based on received samples. For different filters employed by the ALF 1500, the MA circuit 1550 can accordingly include different circuit for the calculation.

In operation, controlled by a clock signal, samples Sa-Sg in lines of L1-L7 in the block 1520 can be received and stored line by line at the register array 1540. As a result, for example, sample Sd in line L1 in the block 1520 can be stored at the shift register at row R7 in the register array 1540, while samples Sa-Sg in line L7 can be stored at the shift registers at row R1. Thereafter, using samples stored in the shift registers in an area 1541 in the register array 1541 as input, the MA circuit 1550 performs a first calculation and a first filtered sample for a first target pixel P1 shown in FIG. 15 can be obtained. Subsequently, one more line of samples in line L8 can be read and shifted into the register array 1540. Then, the MA circuit 1550 can perform a second calculation to obtain a second filtered sample for a second target pixel P2. In this way, as samples are received and stored into the register array 1540 line by line, filtered samples can be continually obtained for a sequence of target pixels below P2 (such as P3) in column d in the block 1520.

In one example, the register array 1540 includes R+S+N rows that are more than the R+S+1 rows shown in FIG. 15. Accordingly, the filter circuit 1530 includes N sets of MA circuits 1550. In operation under such a configuration, at the initial stage, R+S+N lines of samples can first be stored in the register array 1540, then each of the N sets of MA circuits 1550 can perform a calculation in parallel based on neighboring samples of a respective target pixel. Then, at a second stage, N more line of new samples can be retrieved and stored in the register array. Thereafter, another group of N filtered samples can be calculated accordingly at the N sets of MA circuits 1550 in parallel.

Figure 16:
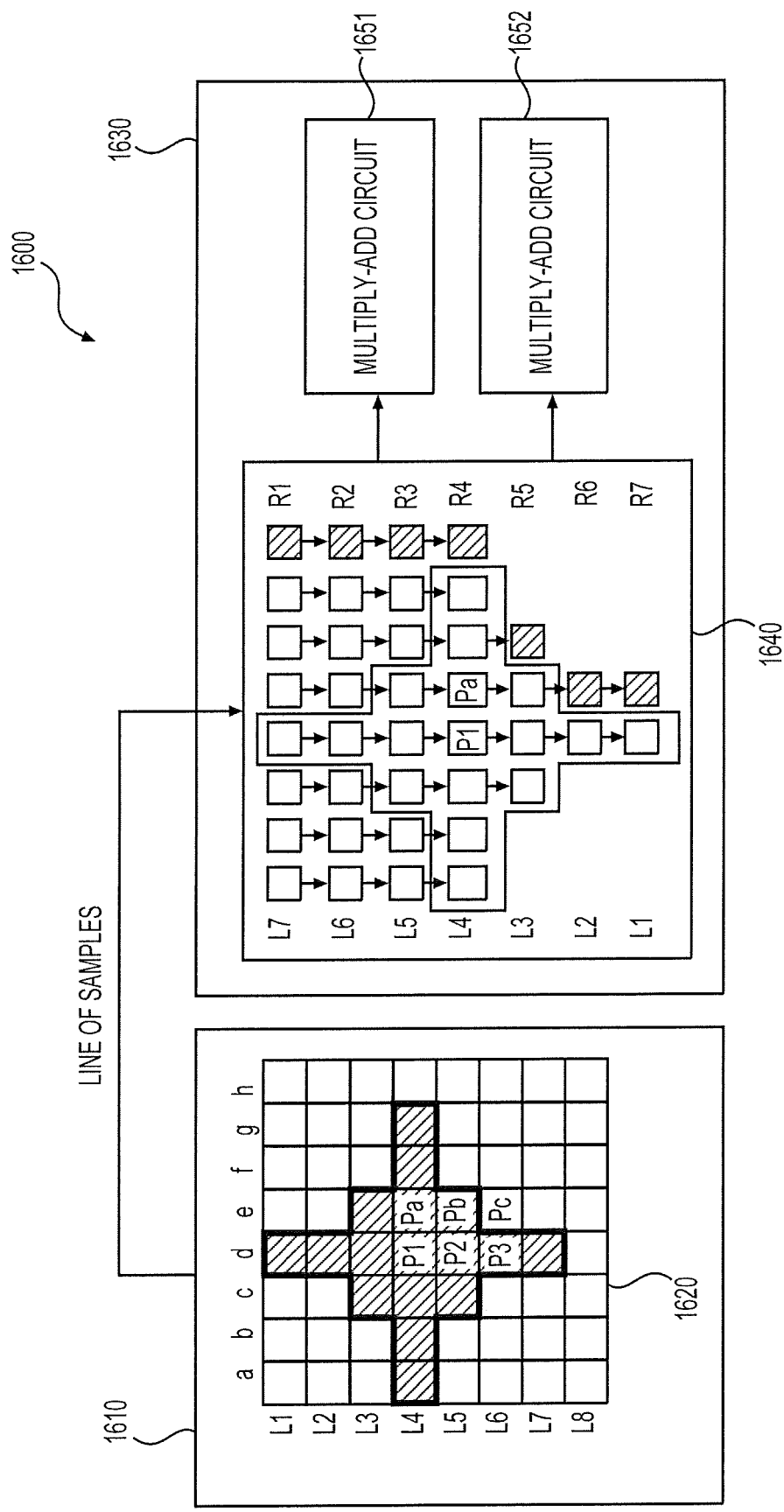
FIG. 16 show a fourth ALF according to an embodiment of the disclosure.

FIG. 16 show a fourth ALF 1600 according to an embodiment of the disclosure. The ALF 1600 implements the 2D data reuse technique. The ALF 1600 includes a block buffer 1610 and a filter circuit 1630. The block buffer 1610 is similar to the block buffer 1510 and is configured to store pre-ALF data. As shown, a bock 1620 of samples are stored in the block buffer 1610. The filter circuit 1630 is configured to receive samples from the block buffer 1610 and calculate filtered samples accordingly. Assume the FIR filter of FIG. 6 is used. The filter circuit 1630 can include a register array 1640 and two MA circuits 1651-1652. The register array 1640 is similar to the register array 1540 in terms of functions and structures. However, each row of the register array 1640 includes one more shift register compared with the register array 1540. The two MA circuits 1651-1652 are similar to the MA circuit 1650 in FIG. 15 example in terms of functions and structures.

In operation, samples in the block 1620 can be read out line by line, and each line can include P+Q+2 samples. Compared with FIG. 15 example, one more sample Sh is read in each line. During an initial stage, R+S+1=7 lines of samples can be received and stored into the register array 1640. Thereafter, the two sets of MA circuits 1651-1652 can each calculate a filtered sample for a respective target pixel, Pl or Pa, as shown in FIG. 16, in parallel. The calculations can be based on neighboring samples of each respective target pixel, Pl or Pa, as defined in FIG. 6 example stored in the register array 1640. During a second stage, one more line of samples in row L8 in the block 1620 can be received and stored into the register array 1640. Then, the two MA circuits 1651-1652 can calculate two filtered samples for target pixels P2 and Pb as shown in FIG. 16. Subsequently, lines of samples can be continually read from the block 1620 and stored in the register array 1640 line by line. For each line of samples, two filtered samples can be obtained for two adjacent target pixels in columns d and e in the block 1620, such as pixels P3 and Pc.

While two MA circuits 1651-1652 are shown in FIG. 16 example to realize 2D data reuse, it is to be understood that more than two MA circuits can be employed in other examples. For example, N number of MA circuits can be included in the filter circuit 1630 operating in parallel, and each line of samples read from the block 1420 can include P+Q+N number of samples. Accordingly, filtered samples of N columns of target pixels neighboring each other in horizontal direction in FIG. 14 example can be obtained in parallel based on samples currently stored in the register array 1640.

Figure 17:
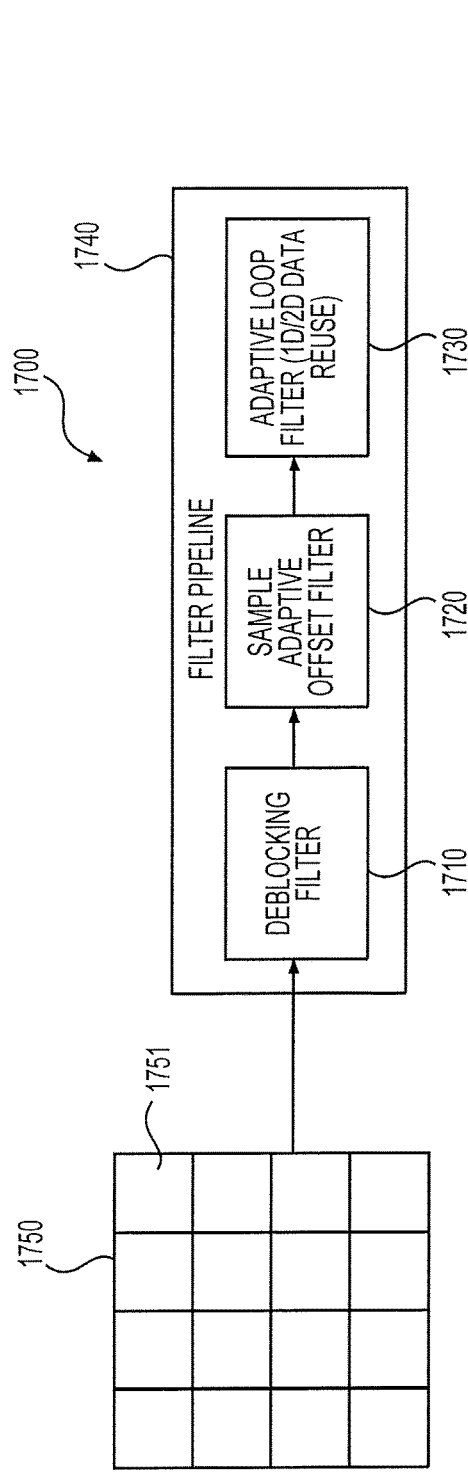
FIG. 17 shows a first in-loop filter circuit according to an embodiment of the disclosure.

FIG. 17 shows a first in-loop filter circuit 1700 according to an embodiment of the disclosure. The filter circuit 1700 includes a filter pipeline 1740. The filter pipeline 1740 can perform functions similar to the filter pipelines 136, 236 or 400A. In one example, the filter pipeline 1740 includes a DF 1710, a SAO 1720, and an ALF 1730. The DF 1710 and SAO 1720 can be similar to the DF 411 and SAO 413 in terms of functions and structures. The ALF 1730 can be an ALF implementing the 1D or 2D data reuse techniques. For example, the ALF 1730 can be one of the ALFs described in FIGS. 13-16.

In one example, the filter pipeline 1740 operates in a block level. For example, a block 1750 of reconstructed video data can be generated and received as input to the filter pipeline 1740. The block 1750 can be one of a sequence of blocks partitioned from a picture. In one example, the partition of the sequence of blocks can be consistent to a partition of CTUs. The filter pipeline 1740 can then process the block 1750 and other blocks in the sequence in a way similar to block level pipeline processing described in FIGS. 4A-4B example. In addition, the block level processing techniques described with reference to FIGS. 7A-7B, FIG. 8, and FIGS. 9A-9B can be employed for processing each block of samples.

In another example, the filter pipeline 1740 operates in a sub-block level. For example, the block 1750 of samples are further partitioned into sub-blocks 1751 for being processed at the filter pipeline. For example, the sub-blocks 1751 can be processed in a way similar to sub-block level pipeline processing described in FIGS. 10A-10B. In addition, the block processing techniques described with reference to FIGS. 11A-11B can be employed for processing each sub-block of samples.

In addition, in an alternative example, the ALF 1730 can includes two or more sets of ALF circuits capable of 1D or 2D data reuse. For a block or sub-block of samples is received from the SAO 1720, a dispatcher may be employed to dispense the received block to the two or more sets of ALF circuits to process two or more blocks or sub-blocks of samples in parallel. The dispatching can balance the processing time for the pipeline when the throughput of an ALF circuit is much lower than the previous stage filtering circuit. Otherwise, if the throughput between the ALF circuit and the previous stage filtering circuit are close, the received block or sub-block may be further partitioned into more sub-blocks by the dispatcher to balance the processing time for the pipeline.

Figure 18:
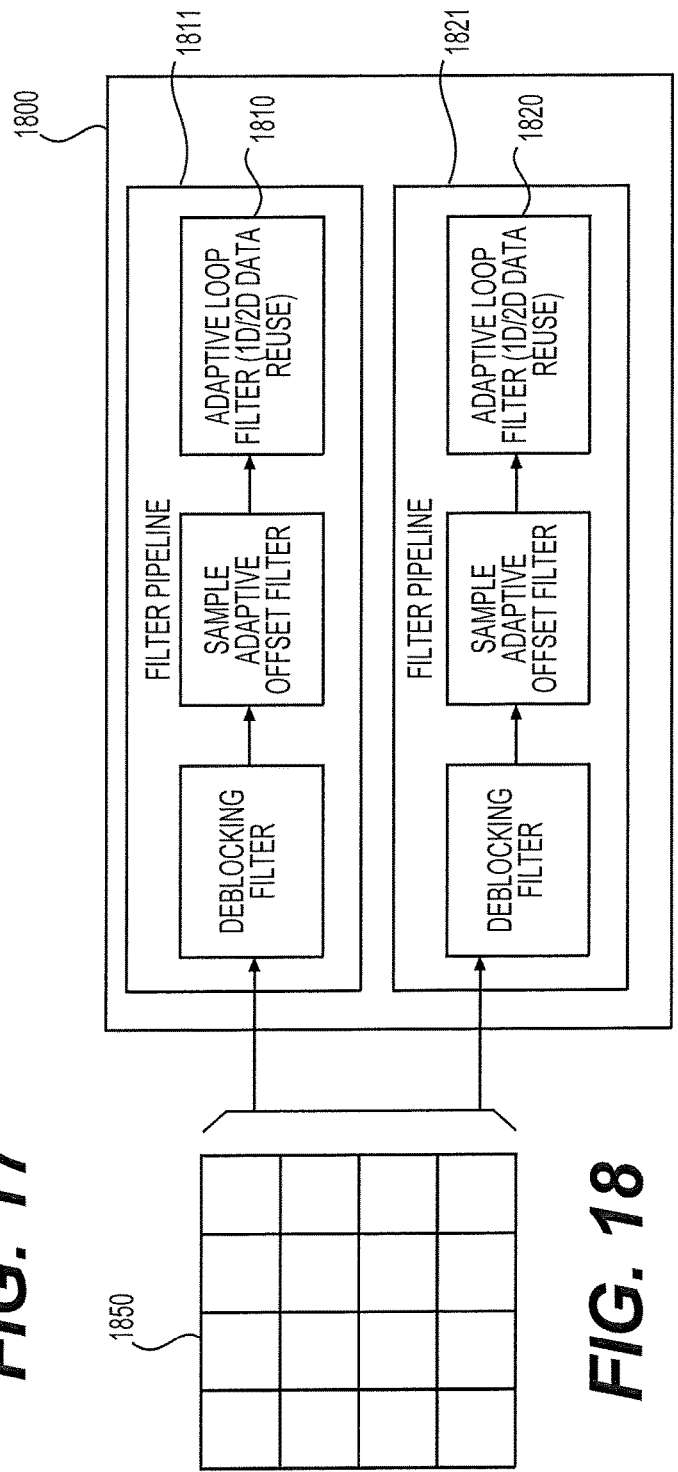
FIG. 18 shows a second in-loop filter circuit according to an embodiment of the disclosure.

FIG. 18 shows a second in-loop filter circuit 1800 according to an embodiment of the disclosure. The filter circuit 1800 can include a first filter pipeline 1811 and a second filter pipeline 1821. Each of the first and second filter pipeline 1811-1821 can be similar to the filter pipeline 1740 in FIG. 17 example. Descriptions of the first and second filter pipelines 1811-1821 are thus omitted. In operation, the two filter pipelines 1811-1821 can operate in parallel to further increase processing speed of the in-loop filtering process. For example, blocks of reconstructed video data can be generated in the encoder 100 or decoder 200 sequentially. When such a block 1850 of reconstructed video data is received, the block 1850 can be further partitioned into two portions. Each portion is subsequently processed by the two filter pipeline 1811-1821 in parallel. For filtering of each portion of samples, the sub-block level pipeline processing in FIGS. 10A-10B and the corresponding block level processing technique in FIGS. 11A-11B can be employed at each filter pipeline 1810-1820.

In addition, in one example, a ALF 1810 in the filter pipeline 1811 can include two or more sets of ALF circuits capable of 1D or 2D data reuse. Accordingly, one of the two portions processed in the filter pipeline 1811 can be further partitioned into two or more sub-blocks when received from a previous stage filtering circuit at the ALF 1810. The two or more sub-blocks can then be processed in parallel by the two or more sets of ALF circuits capable of 1D or 2D data reuse. Similarly, a ALF 1820 in the filter pipeline 1821 can also include two or more sets of ALF circuits capable of 1D or 2D data reuse that can facilitate parallel ALF processing for target samples in a portion of samples received from a previous stage filtering circuit.

Figure 19:
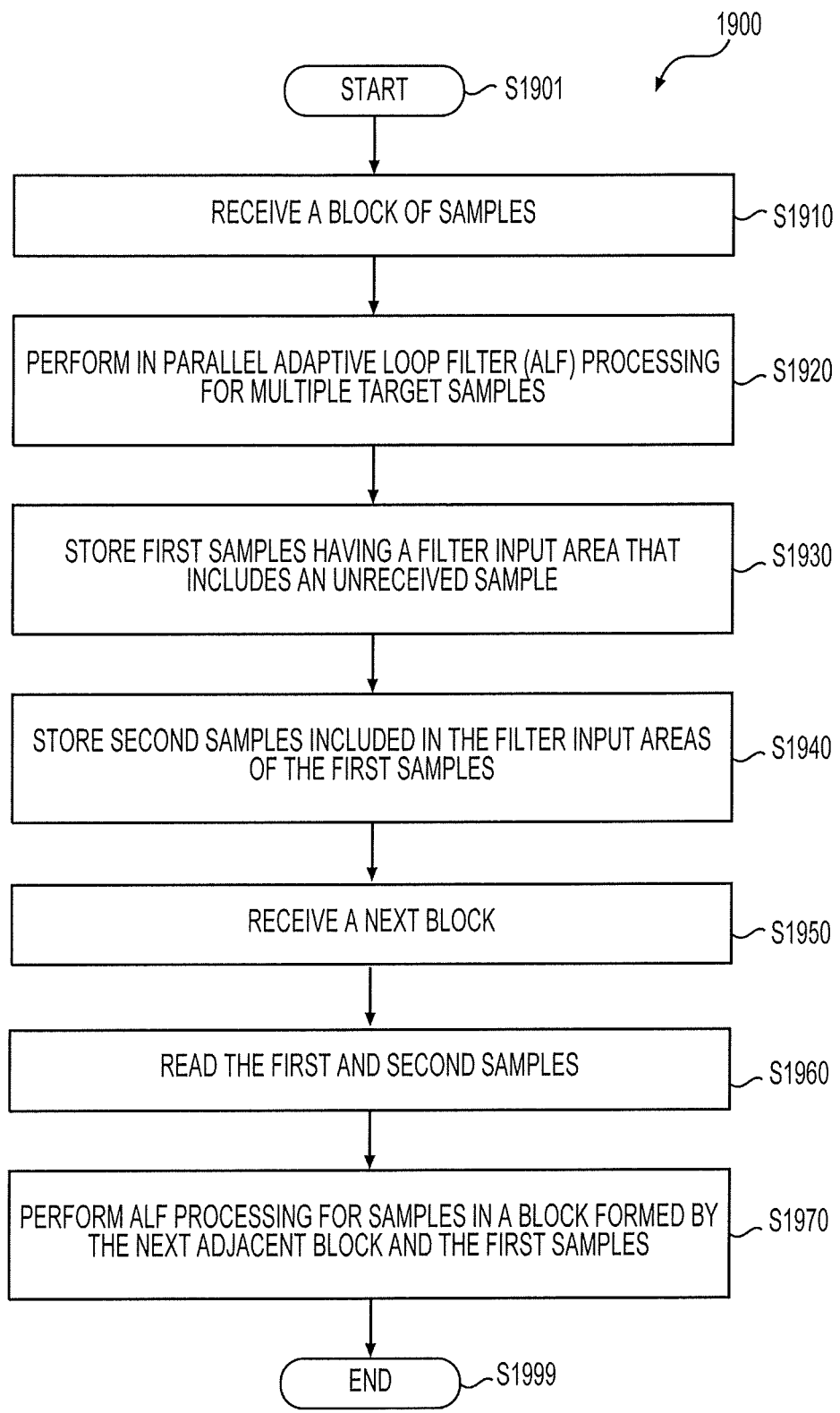
FIG. 19 shows an adaptive loop filtering process 1900 in a video coding system according to an embodiment of the disclosure.

FIG. 19 shows an adaptive loop filtering process 1900 in a video coding system according to an embodiment of the disclosure. The process 1900 can be performed in the ALFs 134, 234, 415, 1730, 1810 or 1820 in the various examples. The process 1900 starts from S1901 and proceeds to S1910.

At S1910, a block of samples is received at an ALF. The block of samples can be generated from a previous-stage filter circuit, such as a DF or a SAO, in a filter pipeline. The block of samples is one of multiple blocks included in a current picture. For example, the received block can be a CTU block or a sub-block of a CTU block.

At S1920, ALF processing for multiple target samples in the block of samples can be performed in parallel. The ALF processing can be performed while the previous-stage filter circuit is simultaneously processing another block in the current picture. For example, the block of samples can be partitioned into two or more sub-blocks, and parallel processing techniques described with reference to FIGS. 17-18 can be employed. For example, the ALF 1730, 1810 or 1820 can include two or more sets of filter circuits capable of 1D or 2D data reuse that can be in operation simultaneously such that two or more target samples can be processed in parallel.

At S1930, first samples are stored in a buffer if necessary. Each first sample has a filter input area defined by a filter shape that includes at least one sample which has not been received. At S1940, second samples included in the filter input areas of the first samples are stored into the buffer. In FIG. 7A example, the samples in the block 711 correspond to the first samples, while the samples in the block 712 except the block 711 correspond to the second samples.

At S1950, a next block of samples adjacent to the block of samples in the current picture is received. The next block of samples can also be generated from the previous-stage filter circuit. At S1960, the first and second samples are read from the buffer if necessary. At S1970, ALF processing is performed for a portion of samples in a block formed by the next adjacent block and the first samples. As show in FIG. 7B example, the block 720 is a next block, and the right most Q columns of samples cannot be processed until a further next block is received. The process proceeds to S1999, and terminates at S1999.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for adaptive loop filtering in a video coding system, comprising:

storing a current block of samples generated from a previous-stage filter circuit in a filter pipeline in a block buffer;

processing samples in a to-be-filtered area with an adaptive loop filter (ALF), the ALF having a left, right, upper, and lower span with a length of P, Q, R, and S samples, respectively, the to-be-filtered area being a part of a first combined region, the first combined region including the samples in the current block and P+Q columns of samples of a first block previously received from the previous-stage filter circuit in the filter pipeline, the P+Q columns of samples of the first block being stored in a side buffer and adjacent to the current block in the picture, wherein the processing includes:
  reading a set of neighboring samples in the to-be-filtered area from the block buffer or the side buffer into an ALF circuit, each of the set of neighboring samples being read once, and
  performing, by the ALF circuit, adaptive loop filtering for two adjacent target samples in the set of neighboring samples to generate two adjacent filtered samples based on the set of neighboring samples; and
storing the P+Q columns of samples of the current block in the side buffer, the P+Q columns of samples of the current block being adjacent to a second block that has not been received from the previous-stage filter circuit in the filter pipeline.

2. The method of claim 1, wherein the previous-stage filter circuit is a deblocking filter (DF) circuit or a sample adaptive offset filter (SAO) circuit.

3. The method of claim 1, further comprising:
receiving the second block of samples adjacent to the current block of samples; and
processing the samples that are a subset of samples in a second combined region with an ALF, the second combined region including the samples in the second block and the P+Q columns of samples of the current block stored in the side buffer.

4. The method of claim 1, wherein the multiple blocks are coding tree unit (CTU) blocks or sub-blocks of CTU blocks.

5. The method of claim 1, wherein the side buffer includes a first buffer storing the P+Q columns of samples of the current block, and a second buffer, and the method further comprises:
  storing R+S rows of samples of the current block in the second buffer, the R+S columns of samples being adjacent to a third block that has not been received from the previous-stage filter circuit in the filter pipeline.

6. The method of claim 1, wherein the reading includes reading the set of neighboring samples line by line as input to a multiple stage pipeline filter (MSPF) circuit, and
  the two adjacent filtered samples are generated from the MSPF circuit successively.

7. The method of claim 1, wherein the reading includes reading the set of neighboring samples line by line as an input to a first MSPF circuit and a second MSPF circuit operating in parallel with the first MSPF circuit, and
  the two adjacent filtered samples are generated at the first and second MSPF circuits, respectively, based on the set of neighboring samples.

8. The method of claim 1, wherein the reading includes shifting in the set of neighboring samples line by line into an array of shift registers having rows of shift registers, each row of shift registers storing a line of shifted-in samples, and
  the performing, in the ALF circuit, adaptive look filtering includes,
    calculating a first filtered sample of the two adjacent filtered samples based on samples currently stored in the array of shift registers by a multiply-add circuit that is coupled to the array of shift registers to receive samples from the array of shift registers,
    shifting in a next line of samples of the set of neighboring samples into the array of shift registers, and
    calculating a second filtered sample of the two adjacent filtered samples based on the samples currently stored in the array of shift registers at the multiply-add circuit.

9. The method of claim 1, wherein the reading includes shifting in the set of neighboring samples line by line into an array of shift registers having rows of shift registers, each row of shift registers storing a line of samples, and
  the performing, in the ALF circuit, adaptive loop filtering includes,
    calculating a first filtered sample of the two adjacent filtered samples based on a first set of samples currently stored in the array of shift registers by a first multiply-add circuit that is coupled to the array of shift registers to receive the first set of samples from the array of shift registers, and
    calculating, in parallel with calculation of the first filtered sample, a second filtered sample of the two adjacent filtered samples based on a second set of samples currently stored in the array of shift registers by a second multiply-add circuit that is coupled to the array of shift registers to receive the second set of samples from the array of shift registers, the second set of samples including a part of the first set of samples.

10. The method of claim 1, further comprising:
partitioning the to-be-filtered area into a first sub-block and a second sub-block,
wherein the processing comprises:
performing first ALF processing for a first target sample in the first sub-block of samples; and
performing second ALF processing for a second target sample in the second sub-block of samples, wherein the first ALF processing and the second ALF processing are performed in parallel.

11. An adaptive loop filter (ALF) circuit in a video coding system, comprising:
  a block buffer configured to store a current block of samples generated from a previous-stage filter circuit in a filter pipeline;
  a filter circuit configured to process samples in a to-be-filtered area with an adaptive loop filter (ALF), the ALF having a left, right, upper, and lower span with a length of P, Q, R, and S samples, respectively; and
  a side buffer configured to store P+Q columns of samples of a first block previously received from the previous-stage filter circuit in the filter pipeline, the P+Q columns of samples of the first block being adjacent to the current block in the picture,
  wherein
    the filter circuit is further configured to read a set of neighboring samples in the to-be-filtered area from the block buffer or the side buffer, wherein each of the set of neighboring samples are read once, and perform adaptive loop filtering for two adjacent target samples in the set of neighboring samples to generate two adjacent filtered samples based on the set of neighboring samples,
    the to-be-filtered area is a part of a first combined region, the first combined region includes the samples in the current block and the P+Q columns of samples of the first block, and
    after the samples in the to-be-filtered area are processed, the P+Q columns of samples of the current block are stored in the side buffer, the P+Q columns of samples of the current block being adjacent to a second block that has not been received from the previous-stage filter circuit in the filter pipeline.

12. The ALF circuit of claim 11, wherein the previous-stage filter circuit is a deblocking filter (DF) circuit or a sample adaptive offset filter (SAO) circuit.

13. The ALF circuit of claim 11, wherein the block buffer is configured to receive and store the second block of samples adjacent to the current block of samples, and
the filter circuit is configured to process the samples that are a subset of samples in a second combined region with an ALF, the second combined region including the samples in the second block and the P+Q columns of samples of the current block stored in the side buffer.

14. The ALF circuit of claim 11, wherein the multiple blocks are coding tree unit (CTU) blocks or sub-blocks of CTU blocks.

15. The ALF circuit of claim 11, wherein the side buffer includes a first buffer storing the P+Q columns of samples of the current block, and a second buffer storing R+S rows of samples of the current block after the samples in the to-be-filtered area are processed, the R+S columns of samples being adjacent to a third block that has not been received from the previous-stage filter circuit in the filter pipeline.

16. The ALF circuit of claim 11, wherein the filter circuit includes a multiple stage pipeline filter (MSPF) circuit configured to:
receive the set of neighboring samples from the block buffer or the side buffer line by line; and
generate the two adjacent filtered samples successively.

17. The ALF circuit of claim 11, wherein the filter circuit includes a first MSPF circuit and a second MSPF circuit operating in parallel with each other, and the first and second MSPF circuits are configured to:
receive the set of neighboring samples from the block buffer or the side buffer line by line as an input, and
generate, in parallel, the two adjacent filtered samples at the first and second MSPF circuits, respectively, based on the set of neighboring samples.

18. The ALF circuit of claim 11, wherein the filter circuit includes:
an array of shift registers configured to receive the set of neighboring samples from the block buffer or the side buffer line by line, wherein each row of the array of shift registers stores a line of samples, and each row of registers are updated with samples stored in an adjacent row of registers when a new line of samples are shifted in to a first row of the array of shift registers; and
a multiply-add circuit connected to the array of shift registers and configured to calculate a first filtered sample of the two adjacent filtered samples based on first samples stored in the array of shift registers, and subsequently calculate a second filtered sample of the two adjacent filtered samples based on second samples stored in the array of shift registers, wherein the second samples are resulted from shifting in a new line of samples to the first row of the array of shift registers.

19. The ALF circuit of claim 11, wherein the filter circuit includes:
an array of shift registers configured to receive the set of neighboring samples from the block buffer or the side buffer line by line, wherein each row of the array of shift registers stores a line of samples, and each row of registers are updated with samples stored in an adjacent row of registers when a new line of samples are shifted in to a first row of the array of shift registers;
a first multiply-add circuit connected to the array of shift registers and configured to receive a first set of samples currently stored in the array of shift registers; and
a second multiply-add circuit connected to the array of shift registers and configured to receive a second set of samples currently stored in the array of shift registers, the second set of samples including a part of the first set of samples,
wherein the first and second multiply-add circuits are further configured to calculate, in parallel, the two adjacent filtered samples based on respective first set and second set of samples currently stored in the array of shift registers.

20. The ALF circuit of claim 11, wherein the filter circuit is further configured to:
perform first ALF processing for a first target sample in a first sub-block partitioned from the to-be-filtered area; and
perform second ALF processing for a second target sample in a second sub-block partitioned from the to-be-filtered area, wherein the first ALF processing and the second ALF processing are performed in parallel.

* * * * *